US008612299B2

(12) United States Patent
Petit et al.

(10) Patent No.: US 8,612,299 B2
(45) Date of Patent: Dec. 17, 2013

(54) HANDLING AND PROCESSING OF MASSIVE NUMBERS OF PROCESSING INSTRUCTIONS IN REAL TIME

(75) Inventors: Henri Petit, Namur (BE);
Jean-Francois Collin, Saint Vaast (BE);
Nicolas Marechal, Marcq (BE);
Christine Deloge, Brussels (BE)

(73) Assignee: Euroclear SA/NV (BE)

( * ) Notice: Subject to any disclaimer, the term of this patent is extended or adjusted under 35 U.S.C. 154(b) by 364 days.

(21) Appl. No.: 12/919,838

(22) PCT Filed: Feb. 27, 2009

(86) PCT No.: PCT/GB2009/050207
§ 371 (c)(1),
(2), (4) Date: Aug. 27, 2010

(87) PCT Pub. No.: WO2009/106901
PCT Pub. Date: Sep. 3, 2009

(65) Prior Publication Data
US 2011/0004788 A1    Jan. 6, 2011

(30) Foreign Application Priority Data

Feb. 29, 2008  (EP) ...................................... 08250696

(51) Int. Cl.
*G06Q 30/00* (2012.01)
(52) U.S. Cl.
USPC .............. 705/26.1; 705/27.1; 705/35; 705/37
(58) Field of Classification Search
USPC .................... 705/26.1, 27.1, 37, 35
See application file for complete search history.

(56) References Cited

U.S. PATENT DOCUMENTS 7,630,986 B1 * 12/2009 Herz et al. ............................. 1/1
7,983,971 B1 * 7/2011 McLuckie et al. .............. 705/35
2005/0149428 A1 * 7/2005 Gooch et al. .................... 705/37

OTHER PUBLICATIONS

International Search Report and Written Opinion, PCT/GB2009/050207, dated May 8, 2009.
Kai Li et al: "Multiprocessor Main Memory Transaction Processing" Dec. 5-7, 1988, pp. 177-187, XP010280434.
Garcia-Molina H et al: "Main Memory Database Systems: An Overview" IEEE Transactions on Knowledge and Data Engineering, IEEE Service Center, Los Alamitos, CA, US, vo 1. 4, No. 6, Dec. 1, 1992, pp. 509-516, XP001167057.
Gray J et al: "Transaction processing: concepts and techniques, Passage" Jan. 1, 1993, Transaction Processing: Concepts and Techniques, p. 249-267,301 , XP002323530.
Gray J et al: "Transaction Processing: Concepts and Techniques" Jan. 1, 1993, Transaction Processing: Concepts and Techniques, p. 333-347,496 , XP002207245.

* cited by examiner

*Primary Examiner* — James Zurita
(74) *Attorney, Agent, or Firm* — Lerner, David, Littenberg, Krumholz & Mentlik, LLP

(57) ABSTRACT

A system is designed for processing instructions in real time during a session. This system comprises: a preloader for obtaining reference data relating to the instructions, the reference data indicating the current values of each specified resource account data file, and the preloader being arranged to read the reference data for a plurality of received instructions in parallel from a master database; an enriched instruction queue for queuing the instructions together with their respective preloaded reference data; an execution engine for determining sequentially whether each received instruction can be executed under the present values of the relevant resource account files and for each executable instruction to generate an updating command; and an updater, responsive to the updating command from the execution engine (for updating the master database with the results of each executable instruction, the operation of the plurality of updaters being decoupled from the operation of the execution engine.

31 Claims, 13 Drawing Sheets

Resource accounts on the master database for parties A and B

Instruction message format

Sets out general operation of known settlement platform

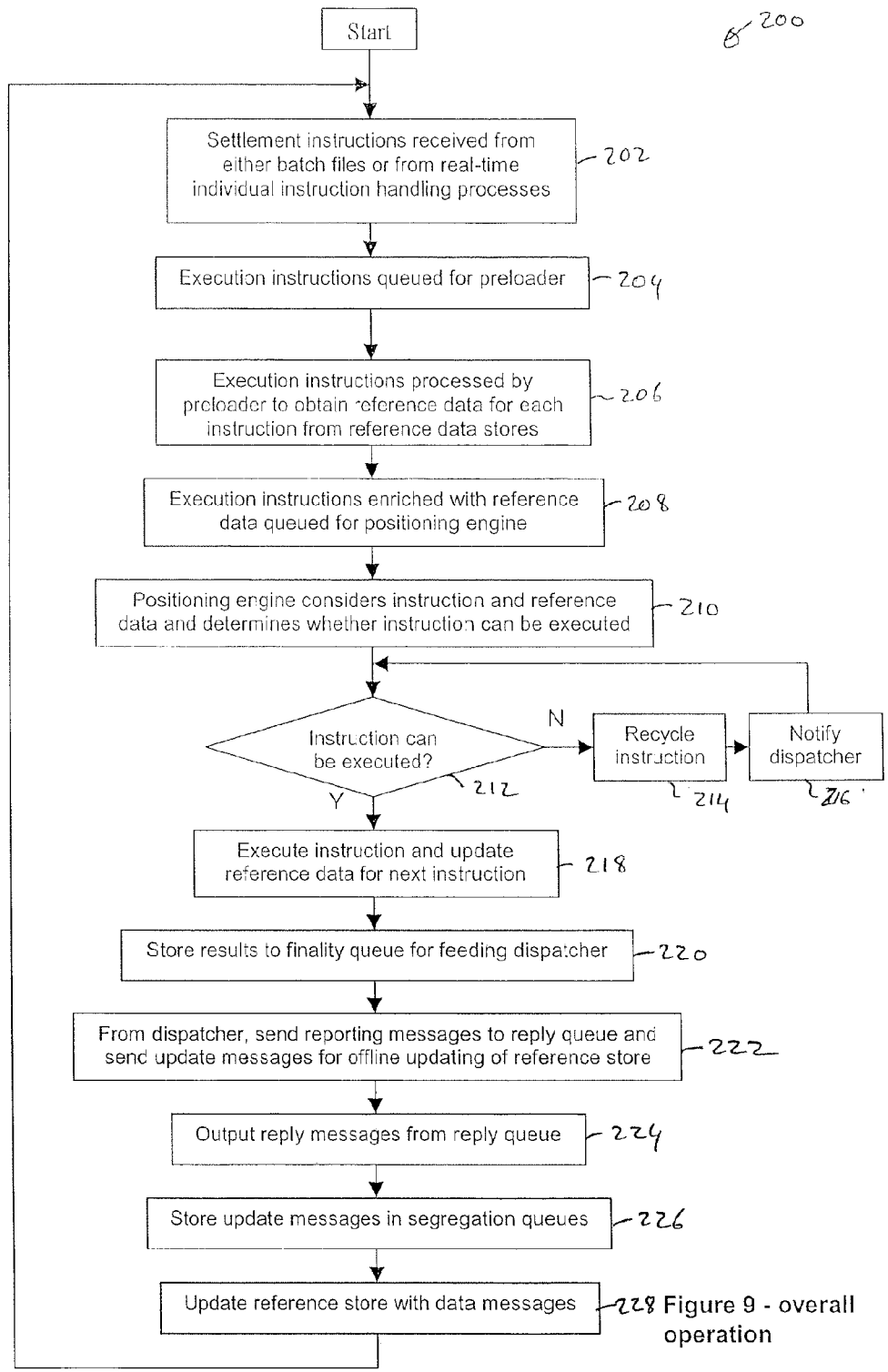
Figure 9 - overall operation

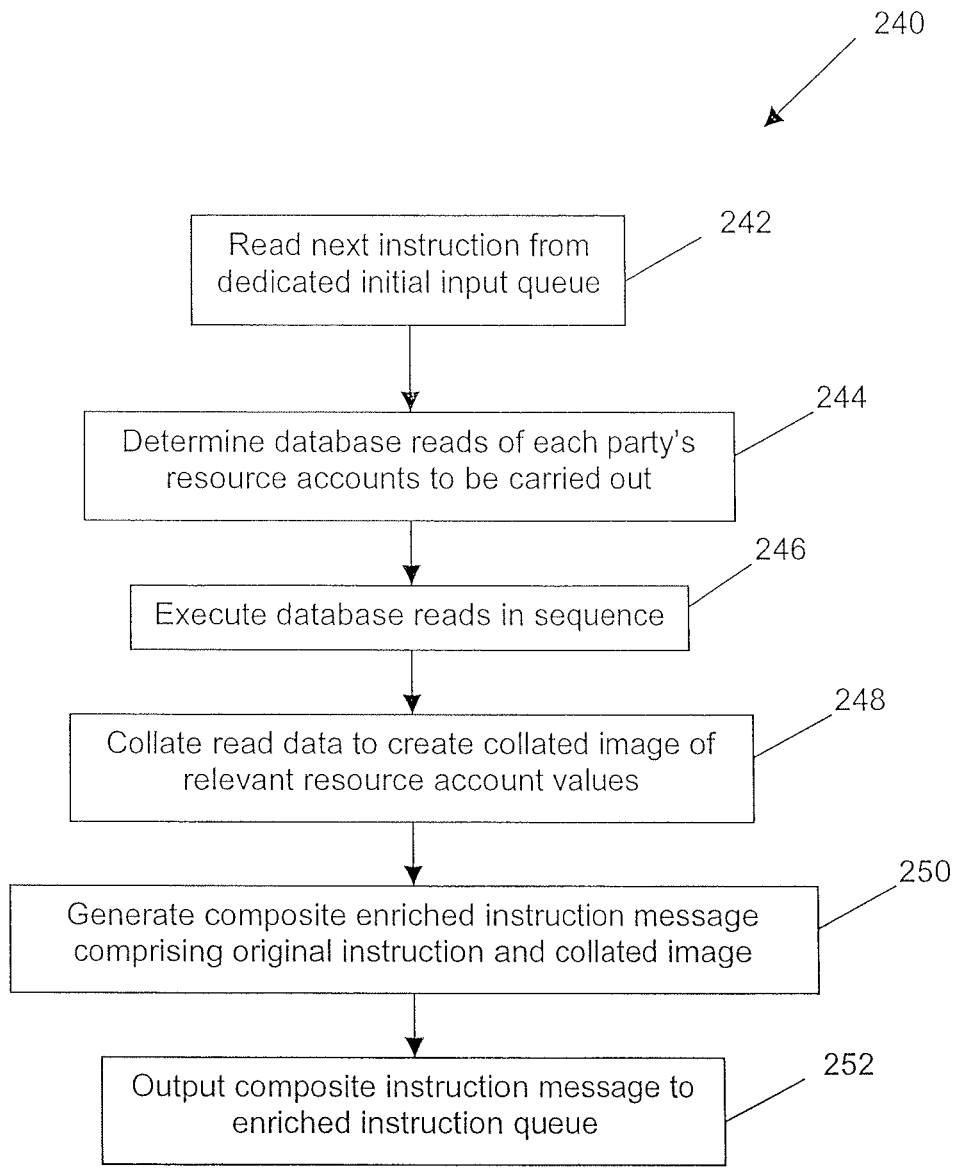
Figure 10 - Operation of Preloader

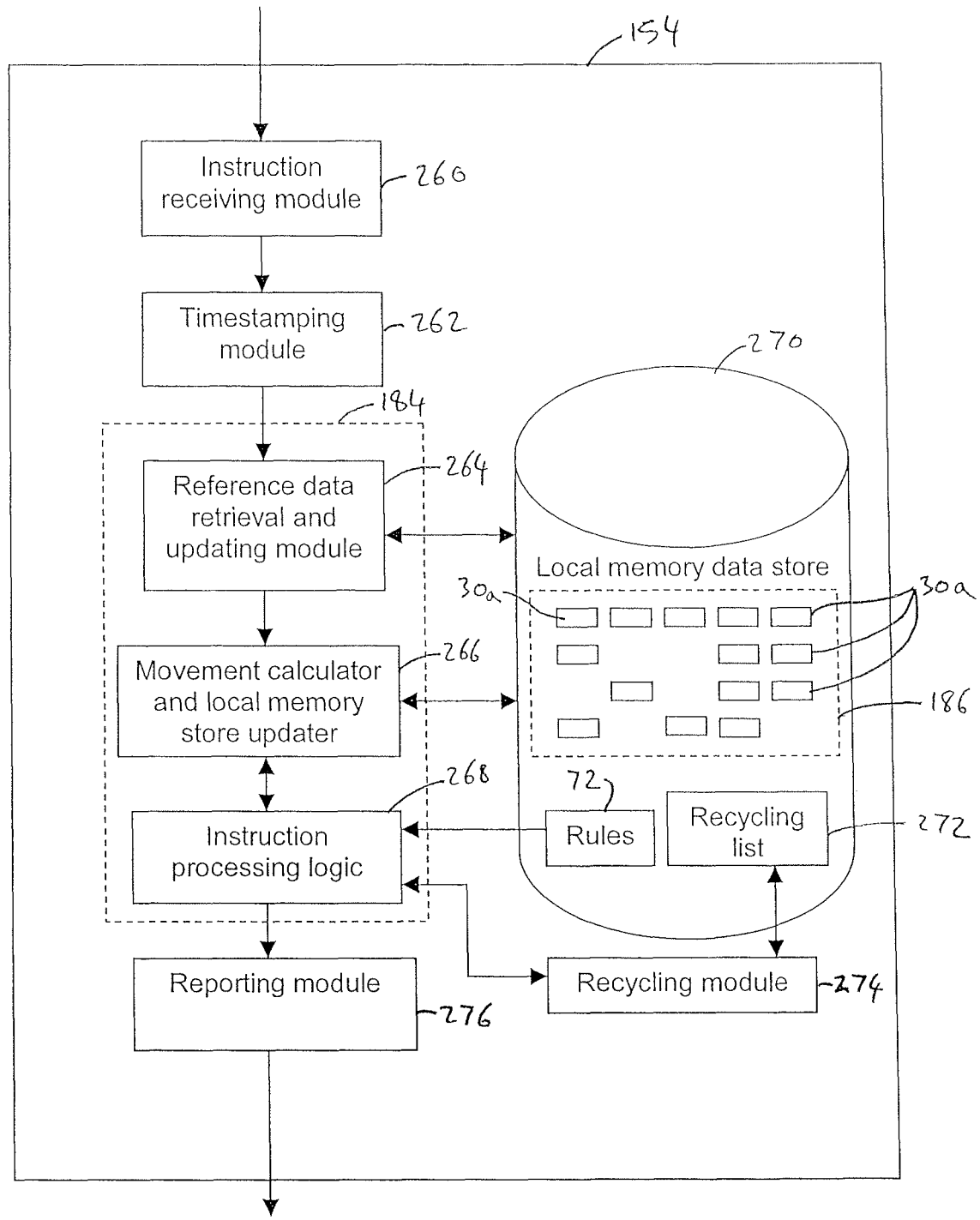
Figure 11 - Positioning Engine

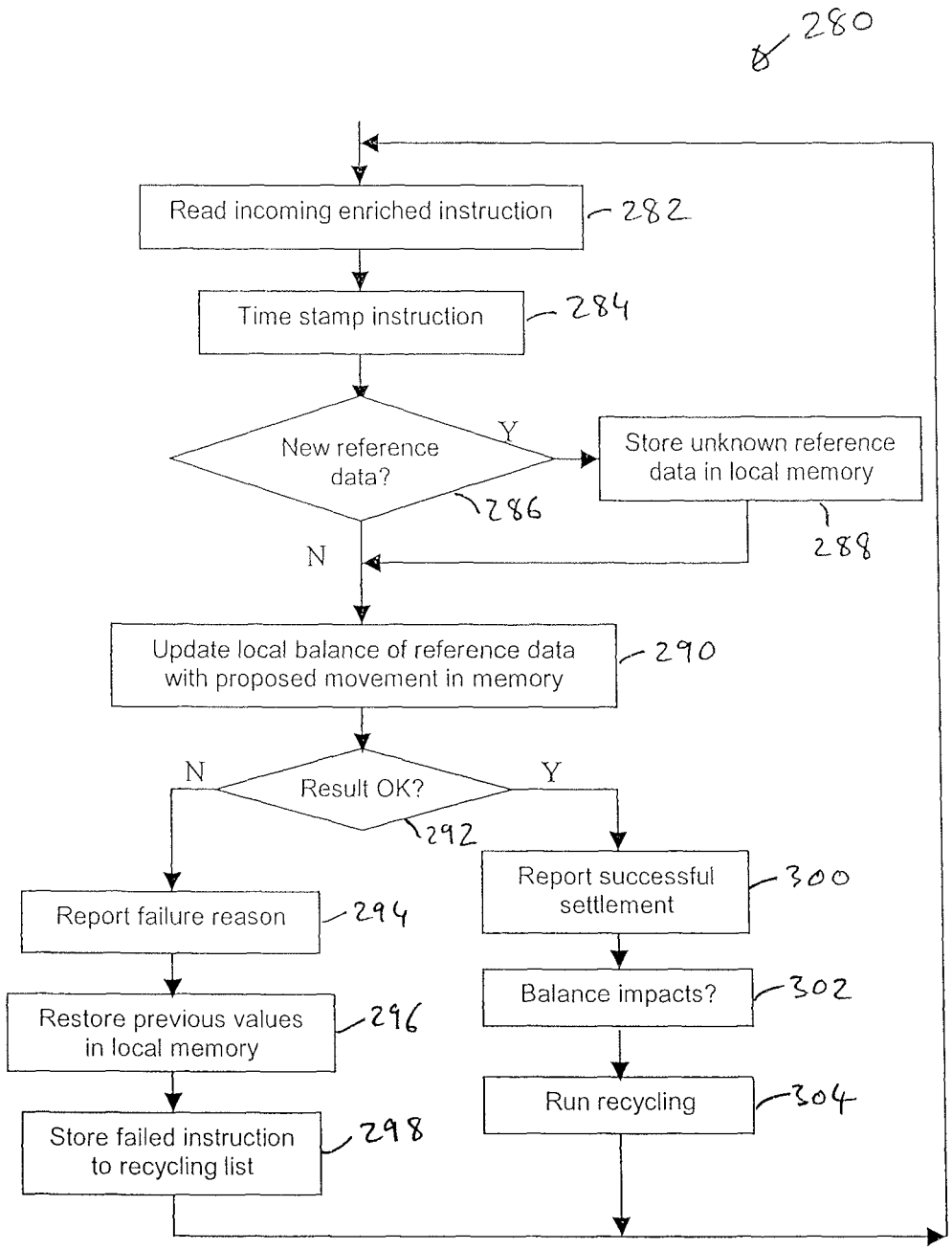
Figure 12 - Operation of Positioning Engine

HANDLING AND PROCESSING OF MASSIVE NUMBERS OF PROCESSING INSTRUCTIONS IN REAL TIME

The present application is a national phase entry under 35 U.S.C. §371 of International Application No. PCT/GB2009/050207 filed Feb. 27, 2009, published in English, which claims the benefit of the filing date of European Application No. 08250696.5 filed Feb. 29, 2008, all of which are incorporated herein by reference.

FIELD OF THE INVENTION

The present invention concerns to improvements relating to handling and processing massive numbers of processing instructions in real time. More specifically, though not exclusively, the present invention concerns a computer processing architecture that is specifically designed to optimise processing of hundreds of instructions per second.

BACKGROUND OF THE INVENTION

There have been various approaches to tackling the problem of handling and processing mass numbers of processing instructions in real time. All of these approaches have been successful in handling vast numbers of such instruction and much of this success has been down to such systems employing faster and more powerful computing. However the architecture, which underlies such approaches, has been limited in one way or another that has capped the maximum possible throughput of such systems.

There are several areas of application of such technology such as mass data communications systems and data processing systems, for example. One such data processing system, which represents a non-limiting but illustrative example of how such technology can be used is a transaction settlement system where data instruction messages representing agreements between different parties can be executed to effect the actual settlement or execution of that agreement. In such an arrangement, an example of which is described in detail below, instructions (or commands) to a trusted settlement entity computer can only be acted on if the conditions determined by the settlement entity computer (rules) allow for execution of those instructions. Therefore, as a first part of the process, checks need to be made on current status of the electronic data account files for the resources, which are the subject of the settlement agreement. These checks determine whether the effects of carrying out the instruction on the electronic data account files are acceptable.

In a second part of the process, the instruction is either: approved for execution, referred to as a 'commit'; or rejected for execution, referred to as a 'rollback'. More specifically, in this non-limiting example, the positions of both parties' resource account files are assessed by the settlement entity computer to determine if the instruction can be executed without resulting in unacceptable positions on the electronic data account files. If the conditions are suitable, the instruction (command) contained within the data record is executed and subsequently the data files storing the current positions of the resource accounts are updated (commit). If the conditions are not suitable, the electronic data account files are left unchanged without execution of the instruction at this moment in time. It is also possible to update all accounts as a default and reverse the update (rollback) if the first stage indicates that the resultant position on the electronic data account files would be unacceptable. This is the preferred option for high-throughput systems. Rolled back data instructions may be recycled and the associated commands tried again at a later stage, once the conditions have changed for failed instructions. All of this needs also to be reported to the computers of the parties to the agreement, often in real time.

One of the characteristics of execution of such data processing which has in the past limited the scalability of solutions proposed, is that quite often the number of different resources which need to be accessed to execute these instructions does not increase with an increasing number of instructions. This is because there is often a concentration of instruction execution on a certain number of resources with increasing numbers of instructions. This concentration is a problem because each instruction, which has an effect on the value of a resource account file, needs to update that value before the next instruction, which specifies that account can be processed. Typically, this is achieved by a particular instruction taking temporary exclusivity (locking) of a given account file whilst it is in the process or checking and then updating the values of that resource account file. This required updating before the next instruction can be processed has a direct effect on the maximum speed at which these increased numbers of instructions can be processed. This is a severe problem for an entity's resources that are common to many different types of instructions. In particular, where 50% of instructions are updating only 5% of the resource accounts, which is considered to be a high-concentration situation, this is a particularly severe problem.

A non-limiting example of this can be seen when a data file storing a cash account for an entity needs to be checked to see if the funds are available for instructions to be executed. The checking of this resource account for each instruction needs to be carried out after the previous instruction has updated the cash account position as a consequence of execution of its instruction. So these processes need to be sequential or else the action of execution of one instruction, which could change the balance of that account, may invalidate any subsequent instruction that also requires access to that account. The maximum processing speeds of prior art architectures (described below) have all been limited by this issue.

Another problem, which has arisen in prior art systems where concurrent processing architecture has been used, is that of 'deadlock'. This problematic condition arises where two concurrent instructions access the same two accounts resulting in one instruction locking one resource account and the other instruction locking the second resource account. This prevents, for each instruction, access to the other account for checking to effect the instruction. Both instructions are caught in a wait state preventing them from executing a commit (execute) action to process the instruction. It is to be appreciated that whilst rollback of one instruction will release the processing of the other one, and is always possible, this solution dramatically decreases the throughput of the instruction processing.

Whilst the basic processes of checking and updating electronic account files appears to be relatively trivial for a single instruction, the processing of millions of such instructions each day makes the solution non-trivial. The objective of any system employed by the settlement entity is to achieve the highest throughput possible in real-time. Scalability of any solution is ultra important as is any small saving in time of any processing step, as such savings are multiplied many times for mass instruction handling.

Many prior art systems have been developed to implement such settlement procedures and a typical example of such a system is now described with reference to FIGS. 1 to 5.

Referring to FIG. 1 there is shown a general prior art central resource management system 10 which is arranged to handle millions of instruction data messages each day. The system 10 is coupled to various communications channels 12 which may be dedicated leased communication lines or may be other types of secure communications channels. Via these channels the system 10 is connected to many different parties servers. In this example and for ease of explanation, the system 10 is connected to a Party As server 14 and to a Party B's server 16. Party As server 14 and Party B's server 16 each have access to a respective database 18, 20 of records, where each record describes an agreement with another party, The central resource management system 10 typically comprises an instruction execution server 22 which has access to a master resource database 24 which contains data records representing all parties' (namely A and B in this example) resource accounts, Referring to FIG. 2 a schematic representation of the master resource database's structure for each party is provided. The database 24 comprises a plurality of different types of resource account files 30 for each party and an indicator 32 of an aggregated resource value for that party. In this particular example, the instruction data messages are each directed to effecting a command or instruction on these account files 30, typically transferring resources from one party's account to another party's account and updating the aggregated resource value indicators 32 accordingly. The accounts are data files 30 which represent the actual resources of the party 14,16. The resources can be any resource of a party. In this example, they represent anything, which the party owns which the party wishes to trade.

Referring now to FIG. 3, a general structure or format of an instruction data message 40 is shown. The instruction data message 40 essentially has six basic fields that are required to effect the instruction. The instruction data message 40 has a Party ID field 42 for identifying the parties to the instruction: in this embodiment, the instruction data message 40 could identify Party A and Party B. A Date of Execution field 44 is provided to define a date on which this instruction message 40 is to be executed. The remaining four fields identify the resource details, which are the subject of the instruction. A first resource type field 46 and a corresponding first resource quantity field 48 are provided for identifying the resource of the first party (e.g. Party A) and the amount of that resource which is to be involved in the instruction. A second resource type field 50 and a corresponding second resource quantity field 52 are provided for identifying the resource of the second party (e.g. Party B) and the amount of that resource which is to be involved in the instruction.

For each agreement between two parties, there will be two instruction data messages 40 in existence (one for each party).

FIG. 4 shows the components of the prior art instruction execution server 22 of FIG. 1. The components include an instruction validator 60, which is arranged to check the validity of a received instruction data messages 40, and instruction matcher module 62 which matches together two different instruction data messages 40 which relate to the same agreement. The instruction matcher also creates a settlement instruction for matched instruction data messages 40. A timing module 64 is also provided for comparing the current time with the time associated with a newly created settlement instruction. Also the timing module 64 can determine whether a timing window for access to the resource accounts files 30 of each party is currently open or closed. An instruction database 66 is also provided for storing settlement instructions for future execution. The instruction execution server 22 further comprises a reporting module 68 for communicating information messages to the relevant parties. Finally at the heart of the instruction execution server an instruction checking execution and updating engine 70 is provided. The reporting module 68 is coupled to the instruction validator 60, the instruction matcher 62 and the instruction checking execution and updating engine 70. The way in which the instructions are to be processed is determined by the specific data processing architecture of the instruction checking execution and updating engine 70, and this varies between different prior art devices (as is described below).

The way in which the instruction execution server 22 operates is now described with reference to the flow chart of FIG. 5. The steps of receiving, validating, and matching the instruction data messages 40 through executing the instructions (settlement instructions) at the positioning engine 70 and updating and reporting the outcomes of the updating are now described in greater detail. More specifically, the general operation 78 of the prior art instruction execution server 22 commences at Step 80 with the server 22 being connected to the communication channels 12 and receptive to receipt of instruction data messages 40. Party A then sends at step 82 a data instruction message 40 to the server 22 which describes an agreement with Party B. similarly, Party B sends at step 84 a data instruction message 40 to the server 22 which describes an agreement with Party A. At the server 22 itself, the messages 40 are received and the instruction validator 60 attempts at Step 86 to validate each of the received instructions 40. If the validity check at Step 88 fails, then this is communicated at Step 90 to the reporting module 68 and a reporting message (not shown) is sent at Step 90 to the source of the non-validated data instruction message 40.

Otherwise, for a validated instruction data message 40, the reporting module 68 in instructed at Step 92 to send a positive message back to the source of the validated instruction message 40 indicating receipt and validation of the instruction data message 40.

Validated instruction messages 40 are passed to the instruction matcher 62 and an attempt at Step 94 is made to match corresponding instruction data messages 40 that describe the same agreement.

The instruction matcher 62 attempts, at Step 96, to match different messages 40 together. If the matching check at Step 96 fails, then this is communicated at Step 98 to the reporting module 68 and a reporting message (not shown) is sent at Step 98 to the source of the non-matched data instruction message 40 and the process ends at Step 100. This failure is shown quite simply here in order to simplify the explanation of the prior art system. However, in practice the failure to match may be a conclusion that is reached only after many attempts and perhaps after the expiry of a set matching time period, which may be several days.

Matched instruction messages 40, determined at Step 96, are notified to the reporting module 68 which in turn reports at Step 102 the existence of a matched pair of instruction data messages 40 to the sources of the matched data instruction messages 40 (Party A and Party B in this case). Furthermore, the instruction matcher 62 then creates at Step 102 an execution instruction (settlement instruction) with an execution date. This execution date is obtained at Step 104 from the date of execution field of either one of the matched instruction data messages 40 (because they are the same). The date of execution of the settlement instruction is then compared at Step 104 to the current date and availability of an execution time window (determined by the timing module 64).

If the result of the comparison, as determined at Step 106, is that the settlement instruction is not executable now, then the settlement instruction is stored at Step 108 in the instruction database 66. The database 66 is checked at regular intervals and the process 78 waits at Step 110 until the execution date is achieved and the execution window is open. Typically, an execution window may be open for several hours each day.

Alternatively if the result of the comparison determined at Step 106 is that the settlement instruction is executable now, then the settlement instruction is not stored.

The next stage in the progression of the general operation 78 of the instruction execution server 22 is to send, at Step 112, the settlement instruction to the instruction checking, execution and updating engine 70 (also referred to as a positioning engine). The positioning engine 70 has associated with it a set of execution rules 72. These rules 72 determine whether the settlement instruction can be executed, namely it determines whether the result of the settlement instruction on the resource account files 30 and the aggregated resource value 32 will be acceptable. An example of an unacceptable condition is if a particular resource account file 30 or an aggregated resource value 32 will have, as a result of executing the command, a value below a predetermined amount. In the non-limiting transaction settlement system example mentioned above, the resource accounts could be cash and security accounts and the aggregated resource value 32 could be a credit line where the current value of the resources provides a certain amount of credit as the resources act as a guarantee against the credit provided.

The positioning engine 70 checks, at Step 114, if the execution rules 72 will still be satisfied if the command is executed, namely of resultant effects on the resource account files 30 and aggregated resource values 32 of the two parties will be acceptable.

If the execution rules are not satisfied as determined at Step 116, a prompt is sent to the reporting module at Step 118 and the reporting module generates and sends at Step 118 a message reporting the unsuccessful results to both parties to the failed settlement instruction, e.g. Parties A and B in this example. Subsequently, the failed settlement instruction remains at Step 120 in the positioning engine 70 and is retried (repeating Steps 114 to 126) for settlement at a later time/date.

If, alternatively, the execution rules 72 are satisfied as determined at Step 116, the settlement instruction is executed at Step 122. The positioning engine 70 then updates at Step 124 the current positions in the resource account files 30 with the results of the executed settlement instruction, namely the resource account files 30 and the aggregated resource values 32 are updated with the correct balances after the transfer of resources has been effected. Finally, the reporting module 68 is instructed at Step 126 to generate and send at Step 126 a message reporting the successful results of the settlement to both parties to the successful settlement instruction, e.g. Parties A and B in this example.

A successful execution of a settlement instruction brings the general operation 78 of the prior art instruction execution server 22 to a close for that single instruction. However, as millions of instructions are being processed each day, the process 78 continues for other instruction data messages 40 which are continually being received from many different party's servers.

As has been mentioned previously, the way in which the settlement instructions are to be processed is determined by the specific data processing architecture of the instruction checking execution and updating engine 70, and this varies between different prior art systems. There are essentially two different types of approaches: a batch process and a parallel input matching process which are now described with reference to FIGS. 6 and 7 respectively.

A batch process is a standard sequential update approach in which execution instructions are stored for sequential processing and are executed consecutively in an automatic manner. This process 130 is illustrated schematically in FIG. 6 where a new instructions file 132 containing a batch (sequential set) of new instructions (settlement instructions) is provided together with a master file 134 which stores the current positions of all of the resource account files 30 and any aggregated positions 32.

Each settlement instruction identifies the two parties to whom the agreement relates, the resource account files 30, the quantities of resources which are the subject of the agreement between the parties and the time/date of execution as previously described in FIG. 3. A key feature of this type of processing architecture is that these settlement instructions are required to be listed in order of the resource account 30 to which they relate. Typically, a sequence key is provided with each instruction which assists with cross referencing.

The master file 134 lists the resource data accounts 30 in order also using the abovementioned sequence key. This order correspondence between the master file and the input data file is very important for batch processing.

A sequential update program 136 is provided to determine whether each agreement can be implemented by settlement of the corresponding instructions. The sequential update program 136, implemented on a processing engine (not shown), uses a standard algorithm called a matching algorithm. As stated above, the matching algorithm requires that both input files (existing master positions file 134 and new instructions file 132) are stored in the same order of sequence keys. The keys used in the instruction file 132 are called 'transaction' keys and the keys stored in the existing master file 134 are called 'master' keys.

The sequential update program 136 defines the logic to read both files 132, 134 in sequence till the end of both files. The results of the sequential update program are stored in a new master file 138, which holds the updated positions of all of the party's resource account files 30 and aggregated positions 32.

The sequential update program 136 starts by reading the first instruction or record of each file 132, 134. All of the instructions relating to a given resource account file 30 are executed sequentially, with each change in the value of the resource account file 30 being updated in memory of the processing engine running the matching algorithm. Once the updates for a particular resource account file 30 have been completed (sensed by a change in the transaction key for the next instruction), the resultant value for that resource account file 30 is then written to a new master file 138 together with any updated aggregated positions 32. This process is repeated for each different resource account file 30 until the end of the transaction file 132 is reached.

Where multiple resource accounts need to be updated to execute an instruction, a more sophisticated approach is used. In order to handle the updating of multiple accounts, the updating is broken down into stages. The solution is to execute the debit of resource account values only in a first run, report the instructions where the debit was successful in order of the credit of resource accounts before applying the credit to the corresponding resource accounts. Whilst there will be problems due to failed instructions because the crediting of resource accounts was delayed, this can be solved by doing multiple runs.

The sequential update program 136 typically defines the logic to handle the following cases:

Transaction key=Master key =>Apply the current instruction to the current master data record of a resource account file
=>Store the new positions of the current resource account as an updated master record in memory =>Read the next instruction
Transaction key>Mater Key =>Write updated master data record to the new master file 138
  =>Restore master data record (if available) or read master file for next master data record
Transaction key<Master Key =>Store current master record
  =>Create default master record
  =>Apply the instruction to the master record
  =>Read the next instruction from transaction file
Or
  =>Reject the instruction because corresponding master file information does not exist, namely no account resource file 30 found in master file 134
  =>Read the next instruction When this is done, the next instruction record is read from the transaction file 132 and the same process is reapplied, until the transaction key becomes greater that the current master key.

In this algorithm, a single process in memory nets multiple updates to the new master file 138, which clearly provides faster processing of the instructions. The limitation is that all the instructions need to be grouped and sorted before running the process (batch). Also all instructions need to be processed before being able to return a first reply message to the parties confirming execution of the instruction. Furthermore in a batch process, the data is not available for other processes while running the matching algorithm. To provide access to the data in real time, database updates are required. If done directly, these database updates kill overall throughput of the process. If implemented in an extra step after the execution (for example a DB2 load utility), it disadvantageously blocks all the accesses to the data during that time. The result of this is that batch processing is very efficient when being executed but it cannot be executed in real-time because of the requirement for grouping and sorting prior to execution.

Another alternative approach is shown in FIG. 7, namely the previously mentioned parallel input matching approach. Under this approach the settlement instructions that are generated by the instruction matcher 62 are handled by a plurality of individual instruction handling computers or processes 140, 142. Also, a sequence file handling process 144 can handle a batch of instructions, stored in the instruction database 66. Each process 140, 142, 144 has its own version of a direct update program 146 which can read the value of a current resource account 30 and an aggregated resource value 32 and create a direct update instruction for the party's resource account files 30 in the master database 24. A single instruction execution manager 148 is provided to make the final decision on the updating of the database 24 by the received instructions from the processes 140, 142, 144. The instruction execution manager 148 uses the set of execution rules 72 (see FIG. 4) to either commit an update instruction for execution or roll it back for later execution.

One of the execution rules 72 which the instruction execution manager 148 has to implement deals with the issue of lockout. As has been mentioned previously, lockout is where access to a resource account file 30 is prevented as it is in the process of being used for another update instruction. In practice what this means is that contention for updating a particular resource account 30 is handled by insertion of wait states until the resource account file 30 has been released from a previous update instruction, namely the previous update has been completed. In this way, the instruction execution manager 148 prevents two different update instructions from modifying the same resource account file 30 in parallel.

Each process 140, 142, 144 runs in parallel and provides greater bandwidth than a single process and this should lead to a greater potential throughput. More specifically, when the updates are distributed over a large number of different resource account files 30, a parallel system is scalable. Under these circumstances it is possible to increase the throughput of the system by running many updating processes 140, 142, 144 in parallel. However, when the updates are not well distributed, the implementation of the lockout process to ensure data integrity quickly caps the maximum throughput the system can reach. When this limit is reached, running one more update process does not increase the global throughput because it also increases the 'wait state' of the other update instructions for unavailable (locked) resource account files 30.

Whilst this approach is excellent for real-time updating, it suffers from poor throughput under most conditions. This is because normally updates are not usually distributed over a large number of different resource files 30. Rather, it is common in many applications for certain resource accounts to be heavily used by many different instructions. For example, in the field of transaction settlement, it is common for 50% of the instructions to be concentrated on 5% of the available resource account files 30. Under these circumstances the real-time processing technique of FIG. 7 has poor performance.

Another issue which is important to consider is that of failed instruction recycling. Here any instruction, which cannot at a particular moment in time be executed, because the resource accounts do not have the required values to meet the execution rules, is simply stored for another attempted execution at a later time. Each temporary failure can be reported to the instructor, indicating that the instruction may be executed shortly once the resource account conditions have changed. Multiple failed attempts or the expiry of a time out period may cause the instruction to be reported as finally failed.

This prior art recycling process is useful in reducing the number of new instruction submissions to the execution engine. By retaining the instruction as 'pending' there is a greater chance it will be processed when the conditions change. Given the volume of instructions being processed, there is a strong likelihood that most recycled instructions will be executed without having to be reported as finally failed.

This recycling however, leads to a problem in the throughput of the execution engine in that it is slowed down by the recycling process. In particular, where there are parallel inputs the instructions describing large resource account movements are often failed as the conditions for their execution are not reached within the recycling period (before time out occurs). Where there are sequential inputs, the failure can lead to a greater number of runs being required to handle the failed instructions.

There have been many efforts to attempt to overcome these problems. Also the amount of money and resources dedicated to finding a solution to these issues is sizable. Despite these efforts, the problem of throughput verses real-time processing in instruction processing architecture remains.

Various prior art techniques have been described in the following papers which serve to illustrate the problem and the length of time it has been known without a viable solution being found.

1) KAI LI ET AL:'Multiprocessor Main Memory Transaction Processing" 19881205; 19881205-19881207, 5 Dec. 1988, pages 177-187, XP010280434.

2) GARCIA-MOLINA H ET AL: 'MAIN MEMEORY DATABASE SYSTEM: AN OVERVIEW' IEEE TRANSACTIONS ON KNOWEDGE AND DATA ENGINEERING,

IEEE SERVICE CENTRE, LAS ALAMITOS, Calif., US, vol. 4, no. 6, 1 Dec. 1992, pages 509-516, XP001167057 ISSN: 1041-4347.

3) GRAY J ET AL: "Transaction processing: concepts and techniques, PASSAGE' 1 Jan. 1993, TRANSACTION PROCESSING: CONCEPTS AND TECHNIQUES, PAGE(S) 249-267, 301, XP002323530.

4) GRAY J ET AL: "Transaction processing: concepts and techniques' 1 Jan. 1993, TRANSACTION PROCESSING: CONCEPTS AND TECHNIQUES, PAGE(S) 333-347, 496, XP002207245.

The present invention seeks to overcome at least some of the above mentioned problems and to provide an improved system for processing and handling very high numbers of processing instructions in real time.

Before considering the further more detailed objectives the present invention, it is important to understand some important characteristics of any instruction processing architecture and these are set out below.

Each new system will have a specific throughput requirement. The throughput represents the number of instructions a system should execute in a predefined period of time to comply with the system's objective. The throughput can be represented by a number of processed instructions per day, per hour, per minute or per second. The throughput is qualified as 'high throughput', when it is greater than 100 instructions per second.

In systems implementing an processing architecture with a single instance of the instruction processor, this processor should be able to achieve the required throughput. However, where the single processor cannot achieve this, having multiple instances of processors processing instructions in parallel should allow the objective to be achieved. In this latter case, the global throughput is the sum of the throughput reached by each of the instances. If the instruction execution process is composed over multiple subsequent steps, the throughput of the overall instruction execution process is determined by the throughput of the weakest (slowest) step (such as a bottleneck).

The response time of a new system represents the elapsed time between the receipt of an incoming instruction execution request from a third party server and the sending of a related reply back to that server. An instruction processing system having an average response time below five seconds can be qualified as a 'real time' system. When running a single instance of the instruction processor, the response time can be measured as the time to process the request (read the request and execute the instruction) and the time to send the reply (generate the reply and send it). If requests arrive at a rate above the throughput of the system, queuing of requests occurs. In this case, the time a request spends in a queue has to be considered as part of the overall system response time to that request. When the instruction processor is composed of multiple processing steps, the overall response time of the system is calculated as the sum of the response times of each of the multiple steps.

Typically, each instruction processing system operates with hundreds of parties' servers and has corresponding resource accounts for each party stored locally. As each party can have many resource accounts (tens and hundreds are not uncommon), it is possible that the resource accounts to which instructions relate are uniformly spread across these many resource account files. However, in some specific applications of the instruction processing system, the requirements are such that a small set of resource account files are frequently involved in instructions such that they are updated with a high frequency. The concentration of an instruction processing system determines the degree to which a small set of resource account files are frequently involved in processed instructions. An instruction processing system having 50% of the instructions updating 5% of the resource account files is defined as having a 'high concentration'.

Given the above described characteristics, another more specific objective of the present invention is to provide an instruction processing system which operates in real time (as defined above), has a high throughput (as defined above) and which can handle a high concentration (as defined above).

SUMMARY OF THE INVENTION

The present invention resides in part in the appreciation of the limitations of the prior art approaches when trying to achieve very fast throughput in a real-time instruction processing system that can handle a high concentration of instructions. The present inventors have developed a new hybrid data processing architecture which harnesses the speed of distributed processing where necessary and the certainty of sequential processing at other times to provide an optimised data processing architecture for massive numbers of instructions which can handle a high concentration and can operate in real time.

According to one aspect of the present invention there is provided a system for processing and handling very high numbers of processing instructions in real time during a processing session, each processing instruction specifying resource account data files relating to two different entities and the quantity and type of resources to be exchanged between those files, the system comprising: a plurality of preloaders, each preloader being arranged to obtain reference data relating to the instructions, the reference data indicating the current values of each of the specified resource account data files 30, and the plurality of preloaders being arranged to operate in parallel to read the reference data from a master database for a plurality of respective received instructions; an enriched instruction queue for queuing a plurality of the processing instruction together with their respective preloaded reference data; an execution engine arranged to determine sequentially using the received reference data, whether each received instruction can be executed under the present values of the relevant resource account files and for each executable instruction to generate an updating command; and an updater, responsive to the updating command from the execution engine for updating the master database with the results of each executable instruction, the operation of the updater being decoupled from the operation of the execution engine.

In arriving at the present invention, the inventors were the first to appreciate the points set out below.

In order to provide a real-time response, the instruction processing system of the present invention needs to be able to process and respond to individual requests. Therefore, it is impossible to implement a pure 'batch oriented' solution, even though such a solution is very efficient.

The instruction processing system of the present invention has to reach a very high throughput, and because of this, a significant number of updates are to be performed against the stored resource account files in a short period of time. In a classical prior art parallel input matching approach (described in FIG. 7), real-time processing is possible and increased throughput could be achieved by running multiple instances of the instruction processor in parallel. However, because of the need for the system to deal with a high concentration of instructions, running multiple instances of the instruction processor in parallel would only result increased locking of instructions, which would disadvantageously decrease throughput.

The present inventors have appreciated that a new specific combination of features for the prior art approaches can result in an improved solution, which meets the present invention's objectives. The new hybrid solution prevents the locking effect on instructions by sequentially processing instructions. The reduction of throughput that this would normally result in is obviated by cutting down the actual processing to a bare minimum, namely by only requiring the instruction processor to make a decision as to whether the instruction itself can be executed. The updating of the account resource files is decoupled from the decision making of the instruction processor and outsourced from it thereby increasing the throughput of the instruction processor. Also by preloading instructions with all of the data required to make the processing decision, time expensive database accesses are prevented by the instruction processor.

Because the present invention is based on running a single sequential execution engine, it requires the preloading of the reference data to the processing instruction, Without this, the single sequential execution engine, which is executed downstream of the preloaders, would not be able to reach the desired high throughput. This is because the execution engine has to read many values of reference data in order to process instructions, and if the read action is implemented to the master database, this would be very expensive in terms of processor cycles. To reach the desired global throughput, the preloading function is implemented as a multi-instance component meaning that a plurality of preloaders are preferably provided for reading master data one for each of a plurality of instructions handled in parallel. Also the preloaders may have multiple input queues (instances) which help to alleviate bottlenecks, with each one of the input queues being arranged to provide a dedicated input to a corresponding one of the plurality of preloaders. The scalability of the parallel processing is not jeopardised by locking issues. This is because the preloader operations are read only, which cannot cause locking problems.

The master database is updated in real time only by the updater. The read only process of the preloaders will therefore advantageously not generate database locking. The preloader is just delayed when trying to read a resource account file already locked by an update process of the updater. The preloader performance is also advantageously scalable by adding new instances of the data reading functionality running in parallel.

The system further comprises a current condition table stored at the execution engine and arranged to be updated with the results of the executed instructions on the resource account files such that representation of an updated real-time value of each of the updated resource account files is obtained; wherein the execution engine is arranged, for the subsequent sequential processing of instructions, to use the information in the current condition table in preference to reference information from the preloaders for a specific resource account file.

Wherein each preloader comprises a master data collector, each master data collector being arranged to read from the master database. Because it is an asynchronous process, it is possible that the retrieved values of the reference data are obsoletes. This is not a problem because the execution engine knows that the master data is accurate when it receives the information for the first time and this is stored in the current condition table. If the first instruction is executed, updates to the values of the resource account files in the current condition table are made. However, subsequent instructions also referencing the same resource account files advantageously use the values in the current condition table to have an accurate updated value for the specific resource account file rather than the obsolete value for the master database.

To ensure the fastest possible implementation of the current condition table, the execution engine preferably comprises a high-speed local data memory for storing the current condition table.

The system may further comprise an initial input queue arranged to receive real-time instructions and batch instructions from a plurality of different sources and to queue the instructions for input to the plurality of preloaders. Also, multiple instances of the initial input queue may be provided to assist throughput. The initial input queue(s) are preferably arranged to assign a priority to each incoming instruction.

Processing instruction failure occurs when the result of processing an instruction would lead to a contravention of a set of execution rules. The rules may provide definitions or thresholds of unacceptable results of processing. For example, an instruction may not be acceptable if it results in an amount of that resource account being below zero. For certain resource accounts, the threshold may be reached when the aggregated resource value is below a predetermined level.

The execution engine is arranged to processing instructions according to the priority of each instruction. Priority control also applies to failed instructions which can be recycled. To do so, the execution engine includes the reprocessing of the failed instructions which could become successfully executable when a change (typically an increase) is generated on a balance of one of the resource accounts to which the instruction relates.

The system operates within a processing session, typically one session per day. From an operational day point of view, the opening of a session triggers the execution of all prestored instructions, which could not be processed when the system was not operational. During this initial period of time, the system behaviour is more batch-oriented. However, even during the session opening period when batches of instructions are being received by the system for processing, the system is able to process in real-time any new incoming non-batch processing instructions, assign a priority to them and sequence the same for processing according to their relative priority.

Preferably the execution engine comprises a recycling module for storing failed processing instructions in a high-speed local memory and for presenting the failed processing instructions for re-execution after an update in the resource accounts files identified by that failed processing instruction has occurred. These failed processing instructions can preferably be prioritised to improve the probability of successful execution during recycling. More preferably, the system can be configured to give higher priority to instructions having large resource account credit or debit movement than instructions having a smaller movement.

Once the bulk of instructions triggered by a session opening are completed, the behaviour of the system is purely real-time. During this time, any increase in value of a particular resource account file or a particular aggregated resource value leads to the recycling of all the previous instructions which failed to settle because the value of that particular resource account file or particular aggregated resource value was too low. This recycling is preferably executed according to the predefined priorities of each of the instructions stored for recycling as described above.

Preferably the recycling module is arranged to store the failed instructions in order of their priority and to present the highest priority instructions first for re-execution during the recycling procedure.

Because the execution engine holds in its memory all the failed instructions, any increase on a level of a resource account file or aggregated resource level can preferably trigger off the recycling of all the failed instructions waiting for its increase.

The execution engine preferably maintains this list of failed instructions in its local memory waiting for an increase (change) in the reference data and it is relatively easy to process the list of instructions following a priority order.

The recycling module may be arranged to reserve the current value of a resource account file for an instruction in the list and to use this reserved amount in fulfilling the requirements of the instruction during a recycling procedure.

Reserving the available resources in a resource account for a large instruction to avoid a smaller instruction using this amount, increases the settlement efficiency in recycling. For example, an instruction needs 50 and the balance is 30. The settlement is failing with a shortage of 20. Reserving the 30 will prevent the execution of a smaller instruction needing only 20 to settle. The goal is to give a chance to the larger instruction of 50 to be executed if a receipt of 20 occurs (which would be provided by the execution of another instructions). This reservation option is maintained for failed instructions. The recycling engine attempts to execute failed instructions which could increase the reservation amount when an increase is generated on a balance amount of a given resource account file.

As has been stated previously, recycling of instructions has in prior art execution engines has led to a slowing down of overall performance of the execution engine. The dynamic recycling described above improves efficiency significantly so much such that the overall performance of the execution engine is, in fact, made faster than if no recycling function was provided at all.

Because the execution engine holds in its memory an updated accurate image of the current values of the resource account files and the aggregated resource levels, any needs for reservation can be easily materialized relatively easily in the local memory itself. Because there is no parallelism in the operation of the execution engine, the instructions are received in priority sequence allowing the highest priority one to reserve first.

The recycling module may be arranged to present failed processing instructions for re-execution a predetermined maximum number of times, and if the processing instruction has still not been executed, the recycling module can be arranged to cancel the failed instruction.

A system embodying the present invention has been built to achieve the desired objectives. In view of the architecture employed, the system has the following technical characteristics:

The system operates in real time. When an entity sends an instruction, feedback (success or failure of the instruction) is typically received within three seconds. This elapsed time includes the time needed to transport the received instruction and a reply message between the entity's communications infrastructure and the system platform and the time needed to execute the processing of the instruction. This breaks down as one second for transporting the message in up to the processing platform, one second for execution within the processing platform and one second for transporting the reply message back to the instructor. It is of course to be appreciated that the transportation times may vary slightly as they do depend on network transit loads and operating conditions. Accordingly, the above times represent an average transport time to and from the SSE for an instruction.

The system embodying the present invention achieves a high throughput. More specifically, the system is able to achieve a throughput of 500 instructions per second at peak times which typically occur at the opening of a processing session (where batch instructions are being received).

The system embodying the present invention achieves what is termed 'Synchronous Finality'. This means that when the execution engine is processing an instruction, the updates to all the effected resource accounts and the aggregated resource values of the entities involved are carried out as part of the same logical unit of work.

The system embodying the present invention is configured to enable access to the master database of resource account values by other applications. This availability, whilst the system is active, is advantageous to the operation of external systems, which also need to refer to the master database.

The design of the architecture of the present invention results in a system having no locking affinity. Updates carried out on the master database are managed in such a way that performance is not impacted when the execution engine updates the same resource account file at a high rate. This feature of the present invention is a real advantage where there is a concentration of updates, for example where a particular aggregated resource value could be updated 50 times a second.

Preferably the system further comprises a pacing module for determining the processing instruction throughput of the execution engine and applying wait states to an instruction injection process (a queue) to slow down the speed of loading of processing instructions to less than the throughput of the execution engine. Further, where the execution engine has several processing modules, each having multiple instance queues for loading instructions, the pacing module is arranged to apply wait states to any queue of any processing module within the execution engine to slow down the speed of loading instructions to less than the throughput of the execution engine itself.

In a message queuing design, the system should avoid storing too many instructions in any instruction queue. In fact, a message queuing system is designed to transport instructions not to hold them as a data container. This last functionality should be reserved to a database. Indeed when queuing many instructions, an instruction queue is not able to hold them directly in memory. Rather, the instruction queue would, in this case, have to offload them on to disk. As a result, the throughput would be severely reduced.

To avoid storing too many messages in the system, the pacing module controls the speed at which new instructions are loaded into the system. Queuing will occur if the load speed is higher than the throughput of the weakest link of the queuing design. To control the load speed, a sleep time called 'pacing' can be executed after each commit to prevent a load throughput exceeding a predefined rate.

Preferably the execution engine comprises a reporting module for reporting the outcome of the execution of a received instruction, the reporting module being arranged to output the update instruction for each instruction which it has been determined can be executed and a notification instruction for each failed instruction.

The system may further comprise a finality queue arranged to receive and queue the update instruction and the notification instruction from the reporting module.

The decoupling of the master database updating from the execution engine decision making is a major shift from the prior art in the architecture of the present invention. The placing of an update instruction into the finality queue is the way the instruction is declared as final. Most prior art batch systems work on an 'all or nothing' basis. So, the finality is reached at the end of the batch. Most prior art real-time systems get their instruction final by committing the change in the master database. In the present invention, the finality is reached as soon as the execution engine commits an update instruction into the finality queue. This means that there is no real-time synchronisation between the executed instructions and the related value of the resource account file in the master database.

This decoupling feature of the processing architecture means that the reference data read by the plurality of preloaders could be outdated. The present invention ensures that the first time a reference data is provided to the execution engine, the value of the reference data accurately reflects the actual current state of the reference accounts and aggregated reference values. To do so, the system preferably needs to ensure that all the update commands reflecting the execution of an instruction are reflected in the master database before commencing a processing session namely, before starting the operation of the preloaders and the execution engine. In other words, it is to be ensured that all the queues are empty prior to starting the processing session.

Preferably, the reporting module is arranged to store temporarily a plurality of update instructions until a commit event occurs, and to output the plurality of stored update instructions on occurrence of the commit event, wherein the commit event represents the completion of one physical unit of work by the execution engine.

By design, the system processing steps comprises a plurality of steps. The global throughput of the system is limited by the weakest link. When a step in the process has a scalability through parallelism, it cannot be the weakest link (performance can always be increased by running a further step concurrently). As a result, the weakest link of the system is the sequential execution engine because it is the only component of the system, which does not support parallelism.

To improve performance of the execution engine and thus the system, everything must be done to keep the operation of the execution engine as much CPU bounded as possible by avoiding unneeded external data access. By using the plurality of preloaders, all the read data needed by the execution engine is preloaded with instructions and, in output, all the update instructions to be implemented are bundled into a single instruction message. In conclusion, the external data access of the execution engine is limited to one persistent message in input and one persistent message in output. Adding other data accesses is possible but it would disadvantageously decrease the global throughput of the system.

To improve performance, everything must be done to avoid burning CPU cycles to perform other logic than the actual instruction execution. As example, CPU cycles are burned during the commit time. So, the execution engine implements a physical unit of work which bundles a set of logical units of work (executing multiple incoming instructions (in local memory) before executing the commit process). With a commit frequency of 50, a throughput of 500 instructions per second leads to 10 commits per second instead of 500! The commit process represents a physical unit of work for the execution engine. A commit frequency of 50 means that 50 processing instructions are executed and reported because entering the technical commit phase which gives the final of all the updates carried out (physical delete of the incoming instruction and physical write of the reporting message).

Preferably the system further comprises a routing framework, the routing framework being arranged to distribute an instruction to a plurality of initial input queues or updating instance queues operating concurrently. This enables the instructions to be distributed evenly where a plurality of different queues or processing elements are available, such as in the preloaders and the updater.

The routing framework may preferably be arranged to assign to an instruction an instruction name describing the type of information the instruction relates to and a workload balancer key which provides the unique key identifying the instruction. In this case, the routing framework can be arranged to select one of the input queues or updating instances by use of the received instruction name and workload balancer key.

Preferably the routing framework comprises a workload balancer arranged, in combination with the routing framework, to select one of the initial input queues or updating instance queues by use of the received instruction name and workload balancer key.

For the each component of the system using parallelism to reach the throughput (such as the preloaders and the updater), the workload is correctly distributed between each of them by means of the workload balancer and the routing framework. However, advantageously this distribution does not create any breach in the sequencing rules defining the order in which incoming instructions are to be executed.

The routing framework and workload balancer are able to distribute the workload on a set of queues (for example, master data segregation queues) and to guarantee that the instructions having the same sequencing key are routed to the same queue. The framework is able to adapt itself directly on the configuration of the target process by analyzing the number of instances available and by spreading the outgoing message without breaking the sequencing constraints.

In other words, the workload balancer is arranged to link a given workload balancer key always to the same specific destination to ensure that all instructions relating to a specific resource account data file are always routed to the same one of the plurality of queues.

Preferably the system further comprises a delimiter framework arranged, in response to the closing of the processing session at a given time, to send a message to the input of a queue provided at the output of the execution engine and to await its response, and to send a further message to an input queue of the updater and await its response, receipt of the sequential responses indicating updating of the master database with the results of all of the processing instructions executed before the close of the processing session.

Where the system comprises a dispatcher module for reporting the results of each processing instruction, preferably the delimiter network is also arranged to send a message to an input queue of the dispatcher and awaits respective feedback to confirm that reporting messages for the processing instructions executed before the close of the processing session have all been sent.

In other words, the delimiter framework sends a message to the output of the execution engine, namely the finality queue. As soon as it receives a response to the message, this indicates that all the instructions stored in the finality queue before the arrival of the delimiter message have been processed. Thereafter, the delimiter framework can send a message to each instance of the dispatcher and waits for a corresponding feedback from each of them. When all the instances from dispatcher have sent their related feedback to the delimiter framework, the delimiter framework knows that all the dispatching processes (instruction, execution, outcome and reporting) have been completed. The delimiter framework can then start the delimiting process on the updater. This is done by sending a message to each instance of the master data updater and waiting all the related feedbacks.

When feedback is received from all of the instances of the master data updaters, the delimiter knows that all the instructions updates related to processing instruction executed by the positioning engine before the deadline, are now reflected in the master database. The delimiter workflow is completed and a session activity report can be generated by the dispatcher.

The present invention also extends to a computer implemented method of processing and handling very high numbers of processing instructions in real time during a processing session, each processing instruction specifying resource account data files relating to two different entities and the quantity and type of resources to be exchanged between those files, the method comprising: obtaining reference data relating to instructions from a plurality of preloaders, each preloader being arranged to obtain reference data relating to the instructions, the reference data indicating the current values of each of the specified resource account data files, the obtaining step comprising operating the plurality of preloaders in parallel to read the reference data from a master database for a plurality of respective received instructions; queuing a plurality of the processing instruction together with their respective preloaded reference data in an enriched instruction queue; using an execution engine to determine sequentially using the received reference data, whether each received instruction can be executed under the present values of the relevant resource account files and generating an updating command for each executable instruction; and updating the master database with the results of each executable instruction using a plurality of updaters which are responsive to the updating command from the execution engine, the updating step being decoupled from the operation of the execution engine.

According to another aspect of the present invention there is provided a system for processing and handling very high numbers of processing instruction messages in real time during a processing session, each processing instruction specifying data files relating to two different entities and the quantity and type of resources to be exchanged between those files, the system comprising: a plurality of preloaders, each preloader being arranged to obtain reference data relating to the instructions, the plurality of preloaders being arranged to operate in parallel to read the reference data from a master database; an instruction message queue for queuing a plurality of the processing instruction messages together with their respective obtained reference data; an execution engine for executing each instruction message sequentially, the execution engine using the preloaded reference information to determine whether the instruction message can be executed under the present condition of the relevant files rather than by using any master database access; and a current condition table arranged to be updated with the results of the executed instructions on the files to establish an updated real-time position of the relevant files; wherein the execution engine is arranged, for the subsequent sequential processing of instructions, to use the information in the current condition table in preference to reference information from the plurality of preloaders for a specific data file if that data file has been updated by the execution engine during the processing session.

This aspect of the present invention is directed to the way in which the updating of the master database is avoided by having a real-time updateable copy of the latest resource account values in memory for the execution engine. This is an important design feature which overcomes much of the problems with prior art processing of massive numbers of processing Instructions in real time.

According to another aspect of the present invention, there is provided a system for processing and handling very high numbers of processing instruction messages in real time during a processing session in which instructions are received asynchronously at different rates, the system comprising: a plurality of processing modules for carrying out different types of processing on the instruction messages with one of the processing modules comprising an execution engine arranged to sequentially process the instruction messages; a plurality of sets of instruction queues, each set being provided to queue input into a respective data processing module; a pacing module for determining the processing instruction throughput of the execution engine and applying wait states to any instruction queue to slow down the speed of loading of processing instructions to less than the throughput of the execution engine.

As has been stated previously a system for processing and handling very high numbers of processing instruction messages in real time during a processing session in which instructions are received asynchronously at different rates, needs to avoid storing too many instructions in any instruction queue. Messages need to be transported rather than stored which is the function of a database. If the number of queued instructions becomes too great, they have to be offloaded to disk which is a time consuming process which directly reduces throughput.

To avoid storing too many messages in the system, the pacing module advantageously controls the speed at which new instructions are loaded into the system. Queuing occurs if the load speed is higher than the throughput of the weakest link of the queuing design, the sequential execution processor in this case. To control the load speed, a sleep time called 'pacing' is executed after each processing time unit to prevent a load throughput exceeding a predefined rate, According to another aspect of the present invention, there is provided a system for processing and handling very high numbers of processing instruction messages in real time during a processing session, each processing instruction specifying data files relating to two different entities and the quantity and type of resources to be exchanged between those files, the system comprising: a plurality of preloaders, each preloader being arranged to obtain reference data relating to the instructions, the plurality of preloaders being arranged to operate in parallel to read the reference data from a master database and to output the reference data together with the instruction message to an execution engine; the execution engine being arranged to execute each instruction message sequentially, the execution engine using the preloaded reference information to determine whether the instruction message can be executed under the present condition of the relevant resource account files rather than by using any master database access; and a high-speed local memory for storing a current condition table arranged to be updated with the results of the executed instructions on the files to establish an updated real-time position of the relevant files; a recycling module for storing a list of failed processing instructions in the high-speed local memory and for carrying out a recycling procedure where the failed processing instructions are presented for re-execution after an update, of the resource account files in the table identified by that failed processing instruction, has occurred.

Preferably the recycling module is arranged to store the failed instructions in order of their priority and to present the highest priority instructions first for re-execution during the recycling procedure. This provides an optimal manner of handling different priorities of instructions efficiently with maximum throughput.

The recycling module may be arranged to reserve the current value of a resource account file for an instruction in the list and to use this reserved amount in fulfilling the requirements of the instruction during a recycling procedure. This ensures that likely demands on resources are identified at an early stage to prevent failure of important due Furthermore the recycling module can advantageously be arranged to present failed processing instructions for re-execution a predetermined maximum number of times, and if the processing instruction has still not been executed, the recycling module can be arranged to cancel the failed instruction. This prevents problems with transactions which are noting going to execute from clogging up the system.

The advantage of this dynamic recycling invention have already been described above in relation to a recycling module and so are not repeated herein.

BRIEF DESCRIPTION OF THE DRAWINGS

Specific embodiments of the present invention will now be described by reference to the accompanying drawings in which:

FIG. 9 is a flow diagram showing the operation of the processing platform of FIG. 8;

FIG. 10 is a flow diagram showing the operation of a Preloader module of the processing platform of FIG. 8;

FIG. 11 is a schematic block diagram of the Positioning engine of the processing platform of FIG. 8; and FIG. 12 is a flow diagram showing the operation of a Positioning engine of FIG. 11.

DETAILED DESCRIPTION OF THE PREFERRED EMBODIMENTS

Figure 1:
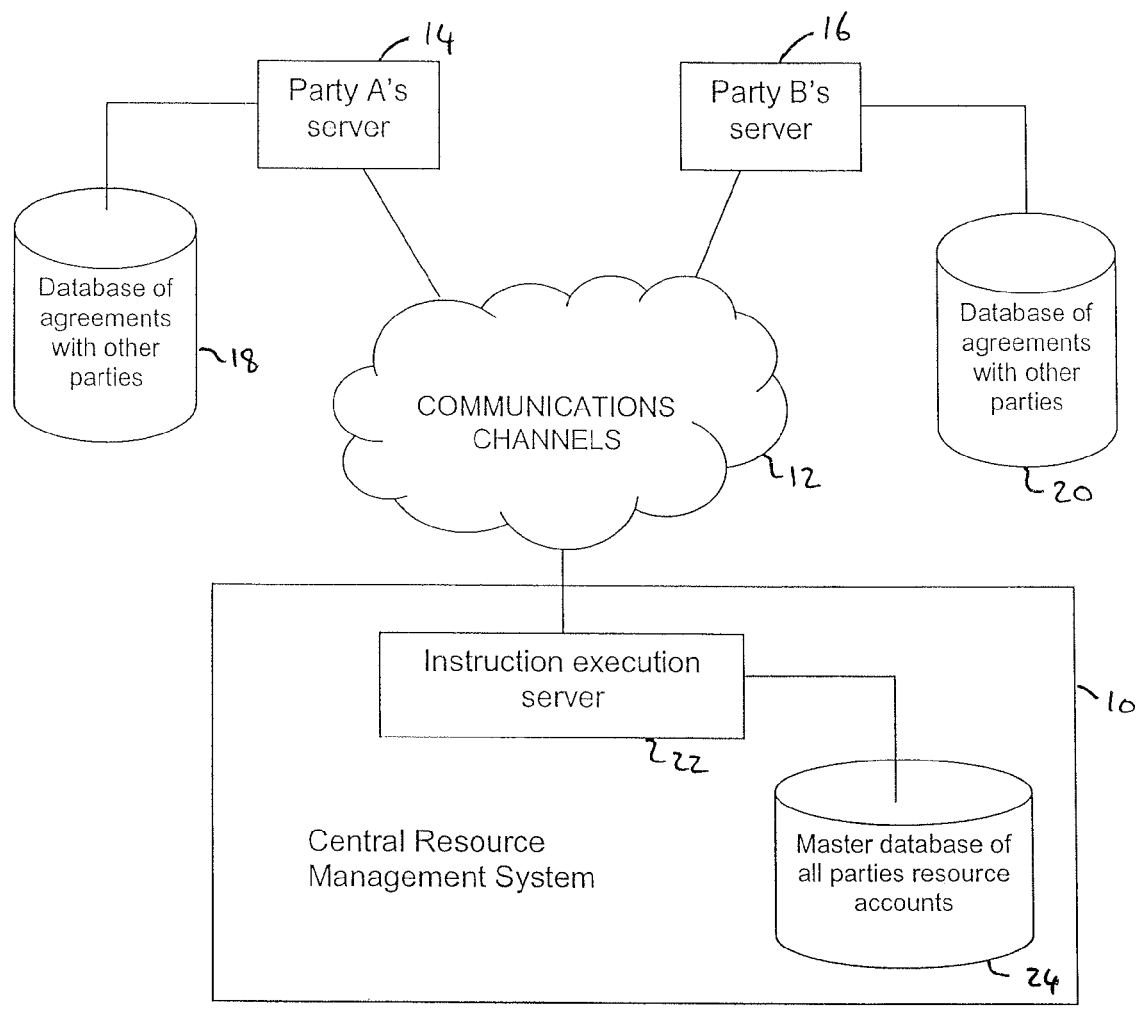
FIG. 1 is a schematic diagram showing basic prior art structure of instruction processing to execute agreements between Party A and Party B.
Figure 2:
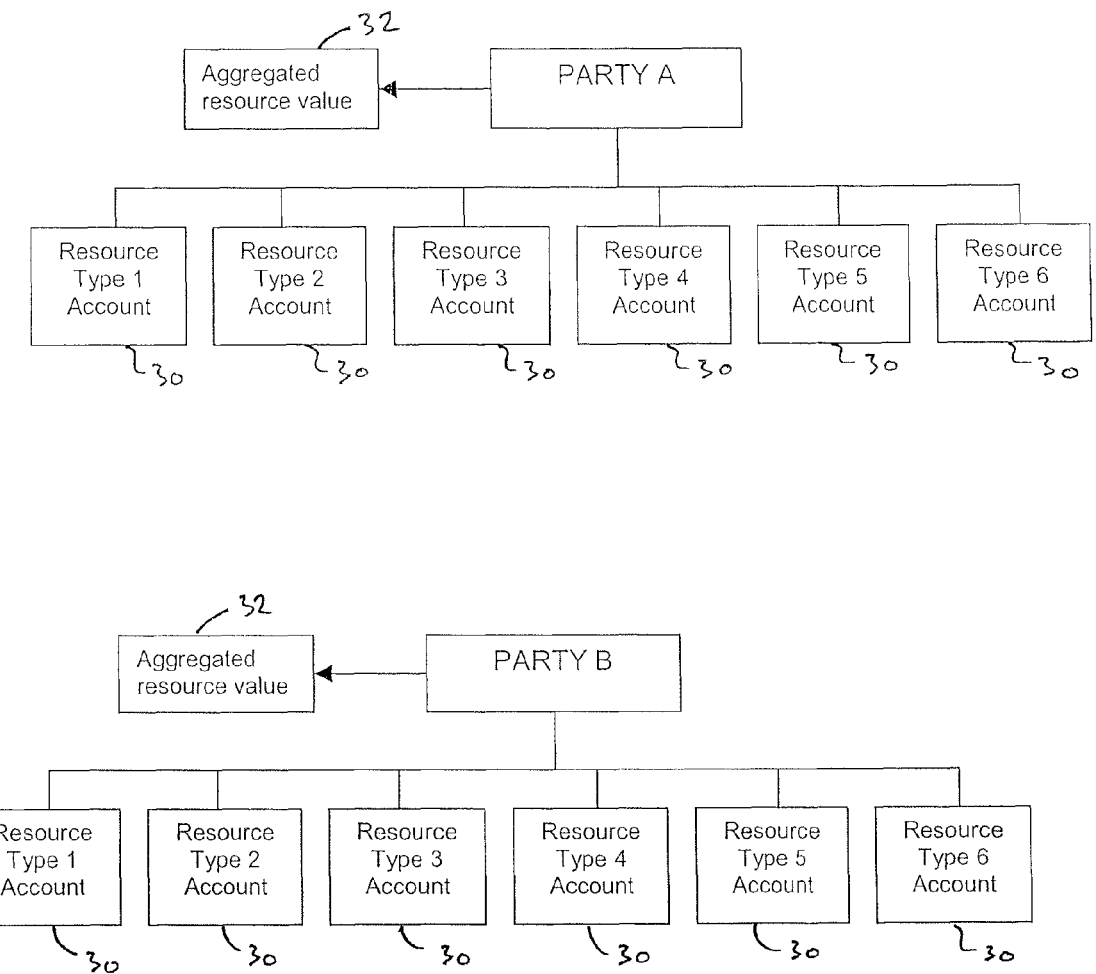
FIG. 2 is a schematic block diagram showing resource account files stored in master database.
Figure 3:
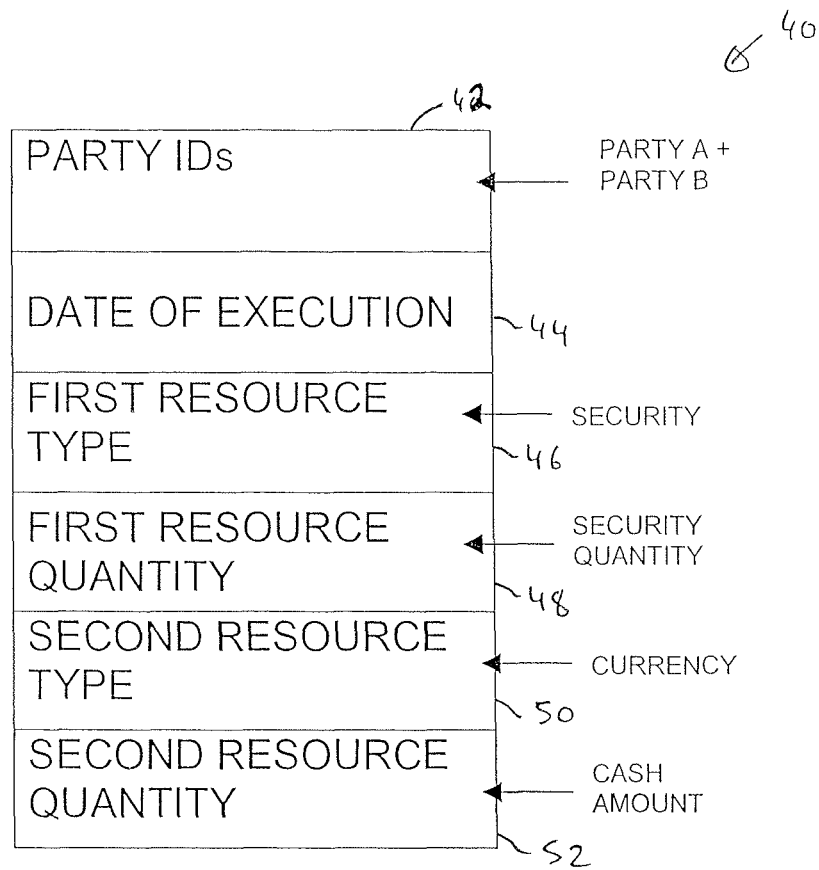
FIG. 3 is a schematic block diagram showing the composition of a data message instruction from a party.
Figure 4:
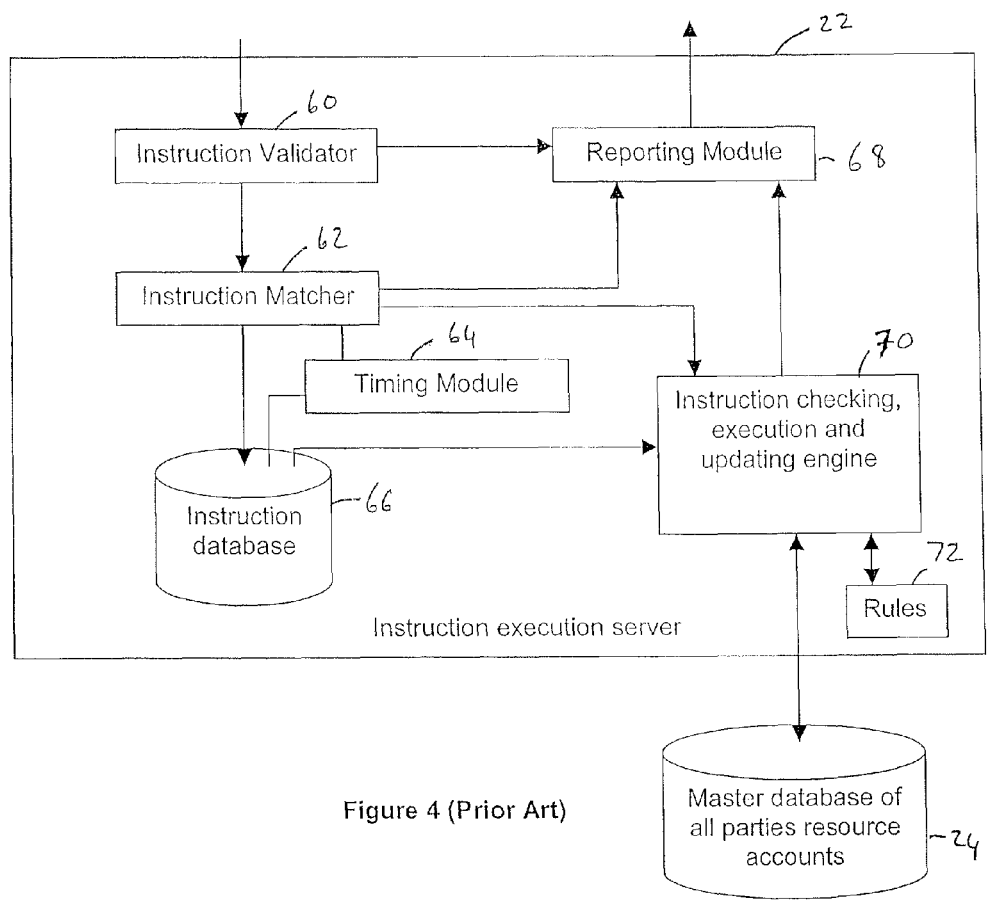
FIG. 4 is a schematic diagram block diagram showing the major components of the instruction execution server of FIG. 1.
Figure 5:
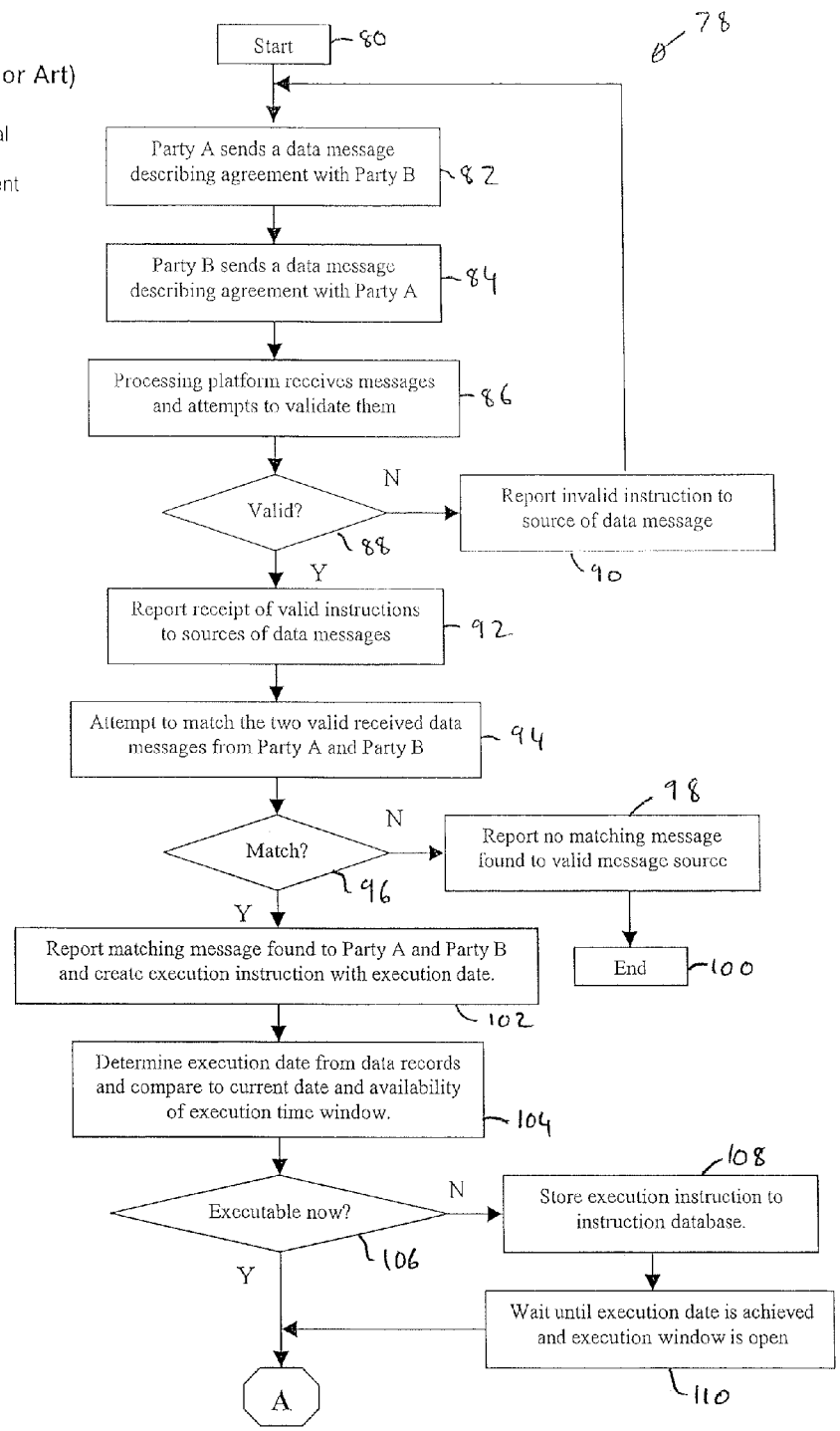
FIG. 5 is a flow diagram showing a general method of operation of the prior art instruction processing platform.
Figure 5:
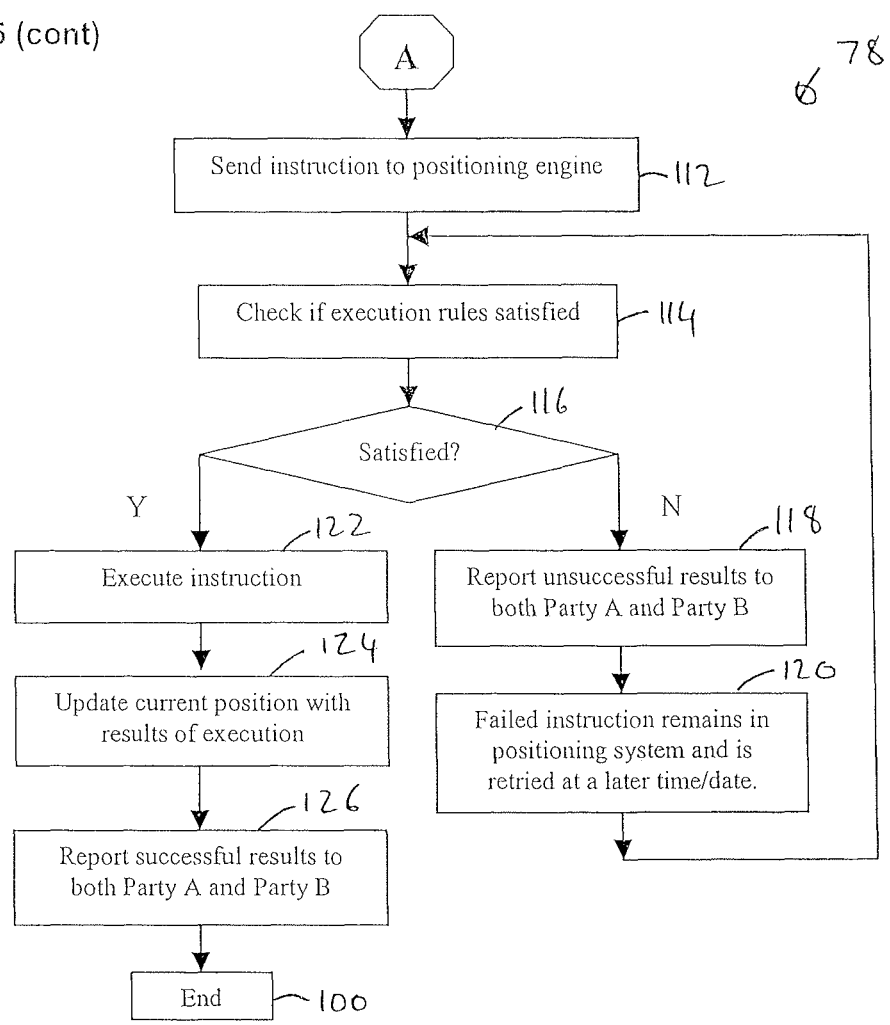
Figure 6:
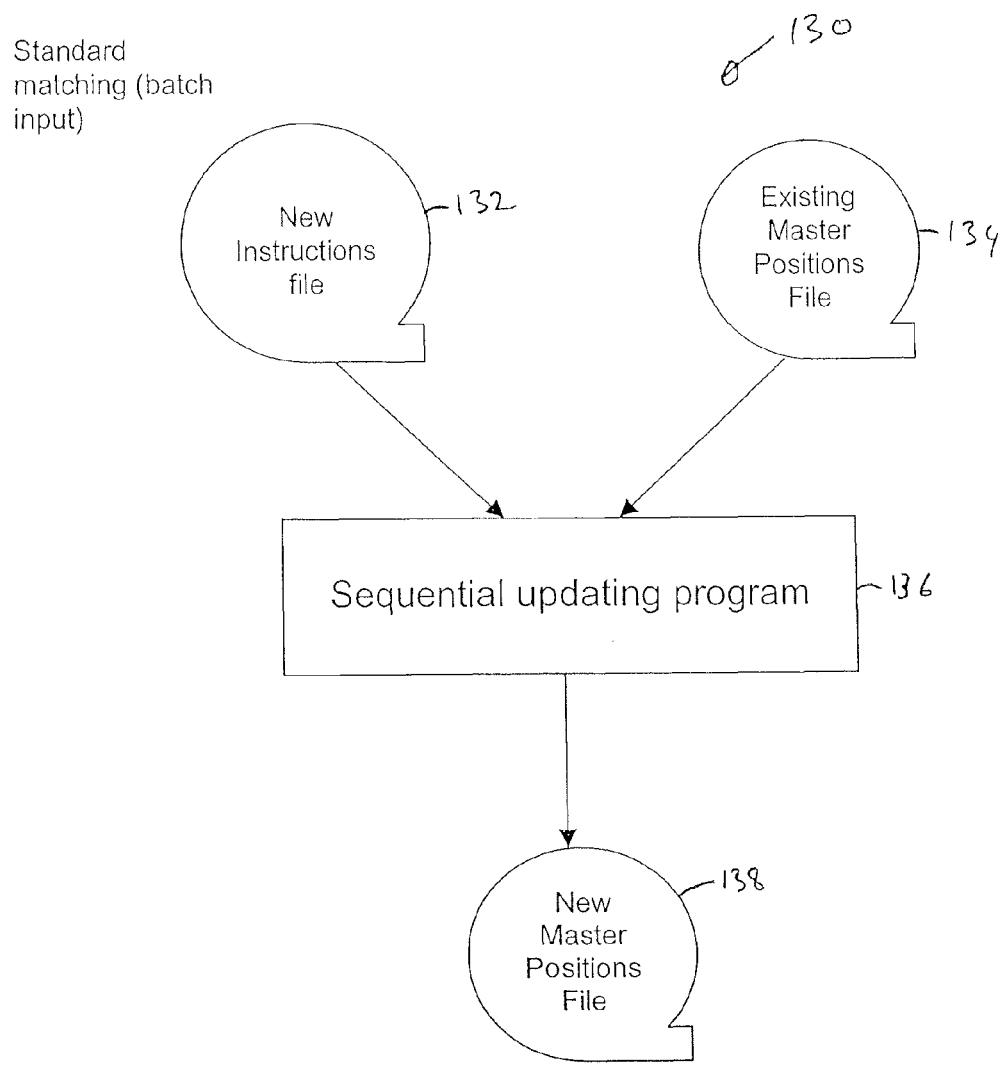
FIG. 6 is a schematic illustrative diagram showing a standard prior art matching process for a batch input.
Figure 7:
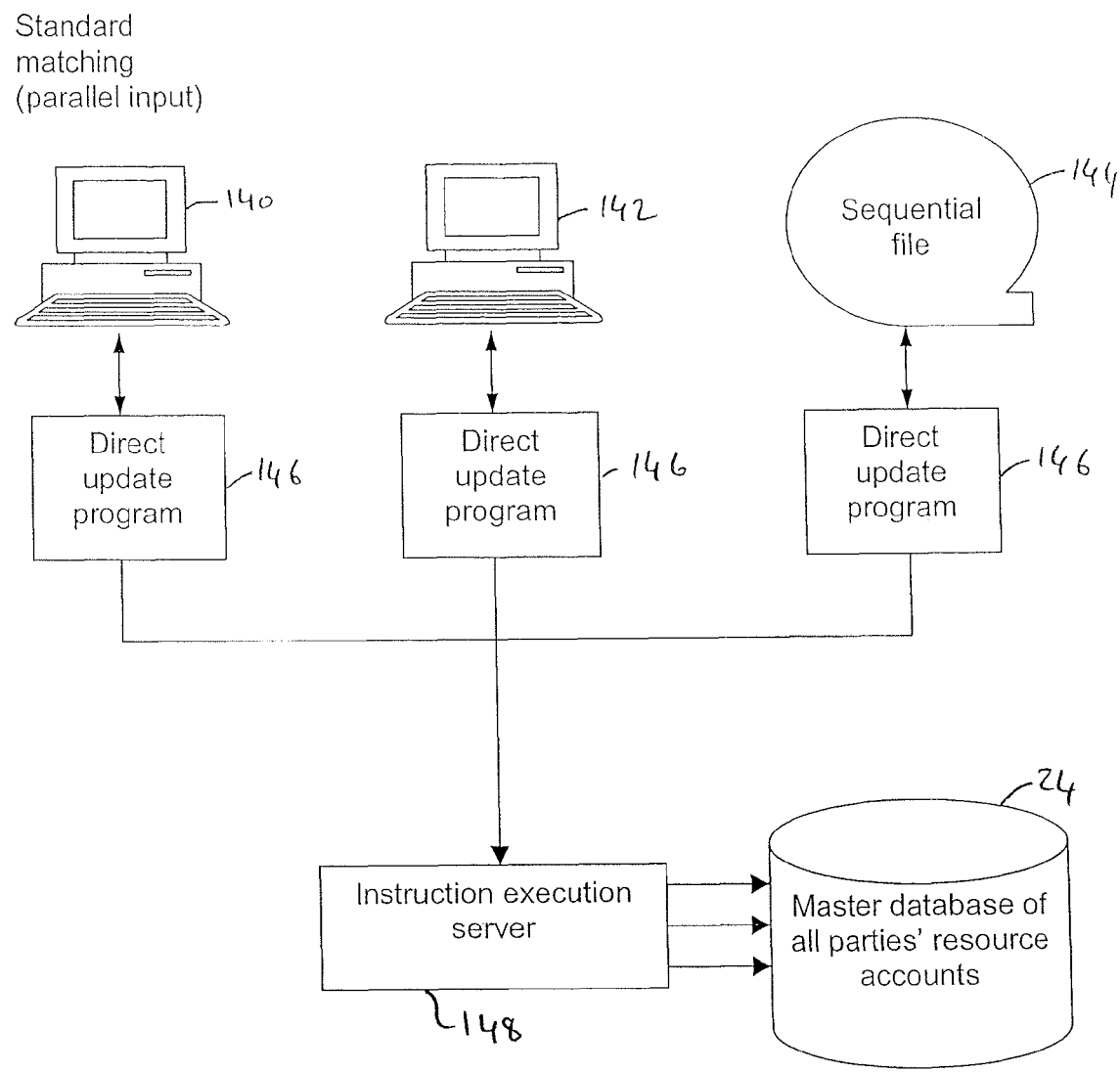
FIG. 7 is a schematic illustrative diagram showing a standard prior art matching process for a parallel multiple process input.

A processing platform 150 according to an embodiment of the present invention is now described with reference to FIGS. 8 to 12. The processing platform 150, resides within an instruction execution server 22 which is similar to that described in the introduction with reference to FIGS. 2 and 4 and is equivalent in general function to the prior art instruction execution server 22. More specifically, the processing platform 150 of the present embodiment described below would replace the prior art instruction checking, execution and updating engine 70 shown in FIG. 4.

Figure 8:
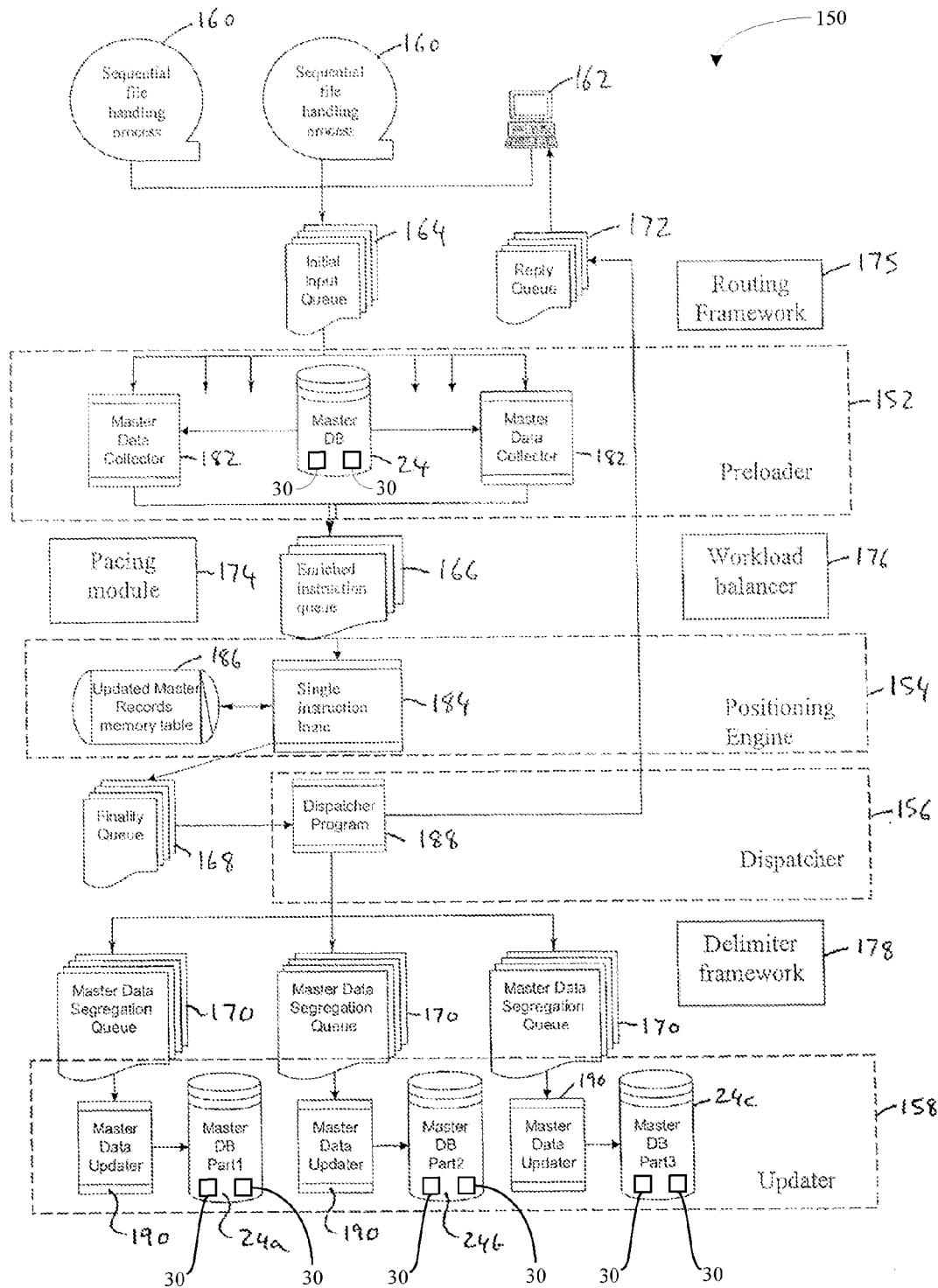
FIG. 8 is a schematic block diagram showing a processing platform in accordance with an embodiment of the present invention.

As can be seen for FIG. 8, the processing platform 150 is comprised of four major components: a plurality of preloaders 152, a positioning engine 154, a dispatcher 156 and an updater 158. These are arranged as set out in FIG. 8 together with queuing and other functional modules as described below.

The preloaders 152 have read only access to the master database 24 of all parties' resource account files 30 and aggregated resource values 32. It is to be appreciated that in FIG. 8, for convenience, the master database 24 is shown to be part of the preloaders 152. However, it is to be appreciated that the preloaders 152 do not comprise the master database 24 as there is only one master database 24 in the system. Rather, each preloader 152 functions to access instructions from its own dedicated initial input queue 164, comprises a master data collector 182 (described below) for obtaining the required information from the master database 24 and outputs the results to the enriched instruction queue 166. Each preloader 152 comprises a master data collector 182 (FIG. 8, however, only shows a total of two for conciseness). The data collectors 182 are modules that handle incoming settlement instructions with each incoming command being assigned to a single master data collector 182. The function of the master data collector 182 is to read the appropriate master data for that command from the master database 24 and combine these together with the original settlement instruction to form an enriched instruction (not shown) which is output from the respective preloader 152. The number of preloaders 152 (and hence master data collectors 182) is scalable as they all carry out their operations in parallel without any database conflicts, such as locking, as they are carrying out read only database operations. Whilst the master database 24 is constantly being updated, these prior art problems are avoided by separating the master database updating and reading functions and also not requiring the read resource account values 30 to be accurate after the first reading in a processing session.

The positioning engine 154 comprises a single instance logic processor 184 and an updated master data records table 186, which is stored in memory of the processor. The updated master data records table 186 comprises a plurality of files 30a corresponding to the resource account files in the master database. However not all the resource account files 30 have a corresponding file 30a as can be seen from FIG. 11 and as is explained later.

The single instance logic processor 184 receives the enriched instructions created in the preloaders 152 and processes these, one at a time, to determine whether to commit or rollback the settlement instruction on which the enriched instruction is based. Essentially, if the values of the resource account files 30 and the aggregated resource value 32 for each party will be, after the settlement instruction is executed, acceptable (namely compliant with the execution rules 72) then the settlement instruction is accepted. In order to make this decision, the single instance logic processor 184 continually updates corresponding files 30a of the updated master records memory table 186 with the latest updated values of each of the resource account files 30 that result from the acceptable settlement instructions. These updated values of the resource account files 30a are used in preference to corresponding values contained in subsequently received enriched instructions. The output of the positioning engine 154 is a list of the settlement instructions that were input into the positioning engine 154 with an indication of whether the instruction is acceptable, namely whether it should be committed or whether it is unacceptable, namely it should be rolled back. In addition, rolled back instructions are retained and can be recycled and this is described in detail later. Those resource account files 30 which are not the subject of an instruction have no counterpart in the master records memory table 186, and hence the size of the memory is smaller than the size of the database.

The dispatcher 156 comprises a dispatcher program module 188. The dispatcher program module 188 receives a list of processed settlement instructions output from the positioning engine 154 and reports the outcome (commit or rollback) of the processing to the parties associated with the settlement instruction. For rolled back instructions, the reasons for failure are stated in the response message. For committed instructions, these are reported as successfully processed settlement instructions and, in addition, they are passed onto the updater 158.

The updater 158 comprises a plurality of master data updaters 190 which each have access to a unique part of the master database 24. For conciseness, FIG. 8 shows three master updaters 190 accessing three parts of the master database 24a, 24b, 24c. However, in this embodiment, this is a scaleable part of the platform 150, such that large multiples of master updaters 190 and associated unique parts of the database 24a, 24b, 24c are provided. The precise manner in which the successful settlement instructions are distributed into the master updaters is described later.

Input into the processing platform 150 is from multiple sequence file handling processes 160 each of which provides batches of settlement instructions 160 as input and one or more individual instruction handling computers or processes 162 (though only one is shown in this embodiment) which handle settlement instructions received in real-time and to be processed in real-time.

Queuing modules are provided between the major components of the processing platform 150. These queues, in some cases, act as a means for converting from a concurrent process domain into a sequential process domain and visa versa. More specifically, a plurality of initial input queues 164 are provided as the input to the plurality of preloaders 152 to queue any of the asynchronous settlement instructions, which may be received from the multiple sequence file handling processes 160 and the individual instruction handling processes 162. An enriched instruction queue 166 is provided for collating the results of the concurrent actions of the master data collectors of the preloaders 152 and putting these into a sequential domain for input into the positioning engine 154. The output for the positioning engine 154 is a finality queue 168, which also acts as an input into the dispatcher 156. Finally, a plurality of master data segregation queues 170 are provided between the output of the dispatcher 156 and the multiple inputs to the updater 158. Another output from the dispatcher 156 is to a reply queue 172, which provides real-time messaging back to the instruction handling process 162.

For the avoidance of doubt, it is to be appreciated that the initial input queue 164, the enriched instruction queue 166 the finality queue 168, the master segregation queues 170 and the reply queue 172 can, as clearly shown in FIG. 8, all be provided by multiple instances, namely multiple queues operating in parallel.

Three further modules are provided to assist in the flow of instructions through the processing platform 150. A pacing module 174 regulates the rate at which instructions are being queued from the batch processes 160 below the weakest link of the throughput of the platform 150. By doing this, the queues in the platform 150 are always almost empty.

A routing framework is 175 is used to route instructions to a queue via a workload balancer 176. The routing framework is flexible in that it can change different aspects of the routing without altering the sequencing of received instructions.

The workload balancer 176 is used to distribute the workload of instructions onto a set of queues and to ensure that an instruction/command having the same sequencing key (described later) is routed to the same queue.

A delimiter framework module 178 is used to ensure that all processing carried out by the positioning engine 154 and which has been written to the finality queue 168 by a given time and date deadline is reflected in the master database 24 and in real-time messages confirming the updating.

Now referring to FIG. 9, the overall operation process 200 of the processing platform 150 is now described. The process 200 commences with settlement instructions being received at Step 202 from either non-real time batch files 160 or from real-time individual instruction handling processes 162. The non-real-time batch files can be created for example by repetitively storing instructions which have a specific future execution date and the batch being created for execution upon arrival of that specific date. The term 'batch' as used here also does not imply that the records have to be arranged in any particular order. For the present embodiment, the ordering of the settlement instructions within a batch does not matter. Rather the term is used simply to denote a collection of settlement instructions.

The process 200 continues with the received instructions being queued at Step 204 in the initial input queues 164 for subsequent input into the respective preloaders 152. This queuing 204 converts the flow of settlement instructions from an asynchronous parallel input domain into a synchronous sequential domain. The instructions are then processed at Step 206 by the plurality of preloaders 152 to obtain reference data for each instruction from the master database 24. This process is carried out in parallel using multiple master data collectors 182, one for each of the preloaders 152.

For each settlement instruction the resultant information is collated to form, at Step 208, an enriched execution instruction which contains the settlement instruction itself and all of the reference master database data needed by the positioning engine to determine whether that instruction can be executed without contravening the execution rules 72. All of the enriched execution instructions are placed, also at Step 208, in the enriched instruction queue 166. Again, the enriched instruction queue 166 functions to convert the outputs of the multiple master data collectors 182 operating in parallel into a list of sequential enriched settlement instructions to be processed.

The positioning engine 154 then sequentially processes at Step 210 each of the queued enriched settlement instructions in order. The detail of this process is described later. However, a determination at Step 212 of whether the settlement instruction can be carried out with contravening the rules 72 is made here. If the answer is negative, then the settlement instruction is recycled at 214 and a notify dispatcher message is generated at Step 216. The message indicates that the settlement instruction was unsuccessful but may be in the future as it is being recycled.

If the answer is positive at Step 212, then the settlement instruction is executed at Step 218 and the corresponding files 30a of the locally stored updated master records memory table 186 are updated with the new values of the resource account files 30 and the aggregated resource value 32 for the parties involved in that settlement instruction. The executed settlement instructions are then stored at Step 220 as update execution instructions in the finality queue 168 for feeding the dispatcher 156 and for subsequent transfer to the updater 158. Whilst not shown in FIG. 9, the recycled instructions also have an entry in the finality queue. These failed instructions are also placed in the finality queue but only for reporting purposes and they are not passed onto the updater 158.

The dispatcher 156 reads the instructions stored in the finality queue and at Step 222 creates reporting messages which are to be sent to the parties identified by the settlement instruction, whether the instruction was successful or not. These messages are sent at also Step 222 to the reply queue 172 for real-time output to the instruction handling process 162 of the party to the settlement instruction. Thereafter the messages in the reply queue are output at Step 224.

For successfully executed update execution instructions in the finality queue 168, the dispatcher 156 also passes at Step 226 these update instructions onto the plurality of master data segregation queues 170. This process involves input from the workload balancer 176 and the delimiter framework 178 as will be described in detail later.

Finally, the part 24*a*, 24*b*, 24*c* of the master database 24 which is assigned to each master data updater 190 is updated at Step 228 by the updater 158.

The key components of the processing platform 150 and their functionality are is now described in greater detail.

The initial input queues 164 are the public interface of the platform 150. It allows merging the input flow coming from individual instruction handling processes 162, for which a reply is expected in real-time, with a batch flows from multiple sequence file handling processes 160, for which a very high throughput is expected. The pacing module 174 controls inputs into the initial input queues 164. The pacing module 174 limits the load speeds of batch instructions below the platform's slowest throughput component, which is typically the positioning engine 154. For batch instructions, the load speed needs to be limited to avoid creating a backlog in the initial input queues 164. The load speed from the individual instruction handling processes 162 is limited by the user computer's real-time capacity to input new instructions. This control of loading the initial input queues 164 applies to all queues in the platform 150.

The pacing module 174 is activated when processing a group of instructions (for example an extract from the master database or file-based batch processing). In FIG. 8, the pacing module 174 is used at the top of the flow, between the sequential files and the initial input queues 164. Its function is like a cruise control, as it limits the rate of batch instruction injection into the initial input queues 164 in order to avoid queuing in the instruction flow (at the weakest link step).

There are two main reasons to control the queue input speed in the platform 150. The first one is that the message queues 164, 166, 168, 170 are effectively a transport layer and not a data container. The number of messages or instructions, which can be stored in a queue, is limited. Creating a backlog can lead to the queue full condition blocking any load process to write to the queue. Moreover, message queuing performance decreases when storing a large number of messages in a queue. This is because often an offload on disk of message data is required.

The second reason to control the speed of the load process is to ensure that real-time instruction coming from an individual instruction handling process 162 will not be queued behind a set of batch instructions. When a real-time request is queued, the response time for the individual instruction handling process 162 cannot match the real-time response requirement, which is set at a maximum response time of two seconds.

Pacing is defined by a minimum delay between two subsequent commits. After executing a commit, the delta time between the time at which the commit is executed and the time at which the previous commit was executed is computed.

Example : current commit=2007-07-01-09.05.04.224335
Previous commit=2007-07-01-09.05.04.100635
The elapsed time between 2 commits (delta) is 0,123700
If the pacing between two commits is 0.5 seconds, then a delay of 0.3763 seconds is to be executed. If the commit frequency is 50 and the pacing is 0.5 seconds, the expected throughput is 100 instructions.

Inputs to the initial input queues 164 are handled by the routing framework 175 and the workload balancer 176 which effect a message routing function in which a workload balancing technical framework is provided for distributing the messages evenly across a predefined set of initial input message queues 164.

It is to be appreciated that there is no differentiation between instructions coming from a batch file 160 or an instruction coming from a real-time channel 162. At the opening of an operating time window (operating session) for the platform 150, all the pending stored instructions are to be sequenced and injected into the initial input queues 164. The sequencing rule also applies to instructions coming in real-time while the opening injection is executed. The real-time instructions have to be injected into the initial input queues 164 based on their priority. When the procedures for opening of the operating time window are completed, the on-going sequencing is time based. Two instructions referring to the same resource account file 30 of the same party have to be injected on the same initial input queue 164 (in order to be processed one after the other).

For the multiple initial input queues 164 running these instances in parallel is important to handle the high volume of initial instructions which is presented at the opening of a processing session (operating time window), for example. Here the routing framework 175 is responsible for loading the instructions into the plurality of initial input queues 164, and this enables the workload balancer 176 to distribute the workload evenly between the initial input queues 164.

Each one of the preloaders 152 is arranged to retrieve settlement instructions from a corresponding one of the initial input queues 164. Its objective is to analyse the incoming settlement instructions in order to retrieve from the master database 24 all the reference data, which would be needed by the positioning engine 154 to determine whether or not to execute the settlement instruction. The reference data would be the current values of any resource account files 30 involved in the settlement instruction and the aggregated resource values 32 for the parties involved in the settlement instruction. This retrieved data is then used to generate enhanced instructions containing not only the incoming settlement instruction but also all the reference data retrieved from the master database 24.

FIG. 10 shows the operation of each one of the preloaders 152 in greater detail. Clearly, each preloader instance 154 is operated independently and in parallel to facilitate greater throughput.

The operation process 240 of a preloader 154 commences with the reading, at Step 242, of a settlement instruction from the initial input queue 164 which is dedicated to that preloader instance 154. The master data collector 182 of the preloader instance 154 then determines, at Step 244, the database reads of each party's resource account files 30 and the aggregated resource value 32 for that party. Once all of these read instructions have been computed, the database reads are executed, at Step 246 in sequence. Thereafter, the read data is processed, at Step 248, by the preloader instance 154 to create a collated image of the reference data for that instruction. This image is then combined, at Step 250, with the original instruction to form a composite enriched instruction. The preloader operation 240 concludes with the composite enriched instruction of each preloader instance 154 being output, at Step 252, to the single enriched instruction queue 184.

The positioning engine 154 implements one of the key elements in the innovative architecture of the present embodiment, namely that the main logic processor 184 of the positioning engine 154 does not execute instructions in parallel. Because the main logic processor 184 runs as a single instance, it has to reach the global throughput by its own. This then raises the importance of the time critical operations of the main logic processor 184. One of the necessary constraints, which has been applied to achieve the highest possible throughput, is to require database accesses to be forbidden, because they lead to a low throughput. After an initial load where the main logic processor 184 can retrieve highly used static reference data, the external data accesses to and from the processor 184 are limited to one instruction being input and one processing result being output. The reference data, which is required in order to process an instruction but is not loaded during the start-up phase, is however made available by means of the collated image of the reference data that is provided as part of each enriched instruction. Only the first image of reference data for a given resource account file 30 received from one of the preloaders 152 will be stored by the positioning engine 154 in its corresponding file 30a of the uploaded master records memory table 186. This first copy is always valid because it hasn't been modified yet by the real-time flow of instructions.

When already in the corresponding files 30a of the uploaded master records memory table 186, the image of the reference data retrieved by one of the preloaders 152 is simply ignored because probably outdated (updates confirmed by positioning engine 154 have not been reflected in the master database yet). Therefore, when reference data relating to the value of a resource account is available in the corresponding files 30a of the uploaded master records memory table 186, this is always used in preference to the reference data image provided with an enriched instruction.

Referring now to FIG. 11, the composition of the positioning engine 154 is shown in greater detail. The positioning engine 154 comprises an instruction-receiving module 260 for retrieving enriched instructions from the enriched instruction queue 166 and a time stamping module 262 for time stamping the current enriched instruction. The single instance logic processor 184 of the positioning engine 154 includes a reference data retrieval and updating module 264, a movement calculator and local memory store updater 266 and instruction processing logic 268.

The reference data retrieval and updating module 264, acts to retrieve data stored in the corresponding files 30a of the uploaded master records memory table 186, determine whether that data is to be updated, and if it is to update the same. The uploaded master records memory table 186 is provided in a high-speed local memory data store 270 to the single instance logic processor 184, which results in fast data read and write times for the positioning engine 154. Accordingly the determination of the execution of an instruction can be carried out with only fast local in memory data checks rather thank time consuming external database checks. The data store 270 also retains a recycling list 272 of failed instructions that are to be tried again for settlement at a later time.

The movement calculator and local memory store updater 266 acts to read the stored reference data within corresponding files 30a of the uploaded master records memory table 186, use the instruction information to determine how that data is to be changed (the movement) and to write the updated reference data back to the uploaded master records memory table 186.

The instruction processing logic 268 is provided to assess whether the updated values of the resource account files 30 and the aggregated resource value 32, result in an acceptable position for that resource data. Namely, the values of the resource account files 30 and the aggregated resource value 32 are assessed for compliance with the rules 72.

A recycling module 274 is provided for reading and writing failed instructions to the recycling list 272 which can in turn be read by or written from the instruction processing logic 268. The output of the single instruction logic processor 184 is to a reporting module 276, which outputs the results of the instruction processing as update execution instructions to the finality queue 168.

Recycling is based on the priority of incoming instructions. A priority grouping (for example top priority, regular priority, and low priority) has previously been assigned to each instruction. The recycling module 274 maintains the recycling list in priority order ready for a recycling event to occur. The order is determined primarily on the priority grouping assigned to each instruction. Thereafter, the size of the instruction is used for prioritisation. By maintaining the priority within the recycling list, the implementation of the recycling is made relatively simple and therefore fast during runtime. Furthermore, the recycling procedure is made dynamic in that it can change the order of re-executing received processing instructions to reflect the priority of each processing instruction.

The recycling module 274 also has the ability to reserve the content of a resource account file 30 for processing with a particular instruction. This occurs when the amount of the available resource in the resource account file is to meet the demands of a stored processing instruction 272. By reserving this amount, the recycling module 274 ensures priority is maintained and that a large high-priority instruction is executed before a smaller low-priority instruction, even if there are funds available to execute the low-priority instruction but not the larger high-priority instruction.

This is best illustrated in the following non-limiting example of how the recycling module 274 in the positioning engine 154 implements reservation and priority handling of received processing instructions.

EXAMPLE

Resource account file Acc/Sec1 contains 50 securities
Processing instructions are received in sequence with the following impact on Acc/Sec1 :
Step1 Top priority Instruction 1 needs 200
Step2 Regular Instruction 2 needs 100
Step3 Regular Instruction 3 needs 150
Step4 Regular instruction 3 brings 60
Step5 Regular instruction 4 brings 290
The memory structure (balance in Acc/Sec1 and the contents of the recycling list) represents the recycling list of Acc/Sec1 as followed:

```
After Step1
Acc/Sec1
    -contains 50
    -Already reserved
        - Instruction 1 for 50
    -failed list <instruction1>
After Step2
Acc/Sec1
    -contains 50
    -Already reserved
        - Instruction 1 for 50
    -failed list <instruction1, instruction2> (ins 2 has less priority than ins 1)
After Step3
Acc/Sec1
    -contains 50
    -Already reserved
        - Instruction 1 for 50
    -failed list <instruction1, instruction3, instruction2> (ins3 same priority as ins 2 but is
bigger so is more important)
After Step4: the increase of balance of Acc/Sec 1 has recycled the failed instruction allowing
instruction 1 to add the new 60 securities to its reservation. The reservation prevents
instruction 2 (needing only 100) to use the 110 securities available in the resource account
Acc/Sec1
    -contains 110
    -Already reserved
        - Instruction 1 for 110
    -failed list <instruction1,instruction3,instruction2>
After Step5: The increase of balance of Acc/Sec1 starts the recycling process.
At the start of the recycling the memory looks like:
Acc/Sec1
    -contains 400
    -Already reserved
        - Instruction 1 for 110
    -failed list <instruction1,instruction3,instruction2>
After the recycling (and the settlement) of instruction 1 (which is first in the recycling list)
Acc/Sec1
    -contains 200
    -Already reserved
        - 0
    -failed list <instruction3,instruction2>
After the recycling( and the settlement) of instruction 2 (new first in the recycling list )
Acc/Sec1
    -contains 50
    -Already reserved
        - 0
    -failed list <instruction2>
```

The recycling of instruction 2 will fail (shortage of 50). If it does not reserve, the memory remains unchanged.

The operation 280 of the positioning engine 154 is now described in detail with reference to FIG. 12. The operation 280 commences with reading, at Step 282, of an enriched instruction from the enriched instruction queue 166, the read instruction is then time stamped at Step 284, by the time stamping module 262. Given the number of instructions, which are being processed per second, the time stamping has a high resolution and is typically records time to down to microseconds.

If the time stamped enriched instruction includes new reference data, namely values for specific resource account files 30 which have not been stored within the corresponding files 30a of the uploaded master records memory table 186, as determined at Step 286, the unknown reference data is stored in the uploaded master records memory table 186. If the reference data is not new, the operation 280 simply moves onto the local balance updating at Step 290 which his implemented on the movement calculator and local memory store updater 266. In this step, the reference data is read from the uploaded master records memory table 186 in the local memory data store 270, the movement specified in the instruction is applied to the read reference data and the resultant value of the reference data is written back to the corresponding files 30a of the uploaded master records memory table 186.

Subsequently, the instruction processing logic 268 then considers at Step 292, the current values of the reference data and determines whether the resultant updated values of the resource account files 30 and the aggregated resource value 32 comply with the predetermined rules 72 regarding acceptable values of the reference data. Where they do not comply, three actions are taken. Firstly the failure reason is reported at Step 294 via the reporting module 276. Secondly, the previous values of the reference data are restored at Step 296. Finally, the failed instruction is stored at Step 298 in the recycling list 272 for a later settlement attempt.

Where the updated reference data does comply with the predetermined rules 72, successful execution of the settlement instruction is reported at Step 300 by the reporting module 276. This reporting acts to generate a reply message for the parties to whom the instruction relates and to instruct the updater 158 to update the master database 24. The impacts of the action are then balanced at Step 302 namely, resource account movement data applicable to the master account data is generated and a set of balance update messages are created. In the example set out below, the generation of the reporting message and the balance update messages is described in two steps.

Finally the recycling action is run, at Step 304, to see if the revised reference data now would allow any of the previously failed instruction to be executed.

Of course, all the reference data which is reported as being updated is kept in the local memory (uploaded master records memory table 186) of the positioning engine 154 in order to be reused while processing subsequent settlement instructions (replacing the outdated version of the same data proposed by one of the preloaders) including recycled instructions.

The updated reference data 30, 32 held in files 30*a* of the local memory 270 of the positioning engine 154 is never just cleared. At the end of a processing period, for example a day, the positioning engine 154 is stopped leading to a full reset of the memory. This reset also happens if a major problem occurs during the positioning execution. A specific restart process has been put in place to guarantee that all the final updates are reflected to the master database 24 and a clearing is carried out of all the pending instructions in the enriched instruction queue 166 before restarting the plurality of preloaders 152 (at that time, the master database 24 reflects the final version of all the balances).

A non-limiting example of how the plurality of preloaders 152 and the positioning engine work 154 together is now provided below.

EXAMPLE

Instruction 1 (Ins 1) is processed by preloader instance 1 (master data collector 1). It is a settlement instruction between acc1 (of Party A) and acc2 (of Party B) for Resource account type:sec1 exchanging 10 securities of Sec1 against 500 units of Sec 2.

Instruction 2 (Ins 2) is processed by preloader instance 2 (master data collector 2). It is a settlement instruction between acc3 (of Party C) and acc2 (of Party B) for sec1 exchanging 20 securities of Sec 1 against 1050 units of Sec 2.

The two instructions are executed in parallel.

The message generated by instance 1 is the following:

(image of the instruction)+(image of the related balances: acc1/sec1=1000, acc2/sec1=300, acc1/sec2=25000, acc2/sec2=30000 . . . )

The message generated by instance 2 is the following:

(image of the instruction)+(image of the related balances: acc3/sec1=3000, acc2/sec1=300, acc3/sec2=5000, acc2/sec2=30000 . . . ).

The two messages are written to the enhanced instruction queue 166 of the positioning engine in sequence.

It is clear that acc2/Sec1 and acc2/Sec2 are given twice with the same value. It is the responsibility of the positioning engine 154 to consider these values when receiving them for the first time (accurate value) and to discard them when received afterwards (reusing the memory copy instead).

The positioning result will be the following:

Processing the instruction coming from instance 1 first (the order is not important)

Balance in local memory 186 before settlement:
<Empty>

Balance in memory after settlement:
<acc1/sec1>=990 (1000−10)
<acc2/sec11>=310 (300+10)
<acc1/sec2>=25500 (25000+500)
<acc2/sec2>=29500 (30000−500)

Processing the instruction coming from instance 2.

Balance in memory before settlement (=balance after settlement for the previous instruction)
<acc1/sec1>=990 (1000−10)
<acc2/sec1>=310 (300+10)
<acc1/sec2>=25500 (25000+500)
<acc2/sec2>=29500 (30000−500)

Balance in memory after settlement
<acc1/sec1>=990 (unchanged)
<acc2/sec1>=330 (310+20: the value 300 given by the preloader is discarded)
<acc1/sec2>=25500 (unchanged)
<acc2/sec2>=28450 (29500−1050: the value given by the preloader is discarded)
<acc3/sec1>=2980 (3000−20)
<acc3/sec2>=6050 (5000+1050)

The finality queue 168 is an important part of the present embodiment. It represents a way of decoupling the decision making of the positioning engine 154 about the acceptability of a given instruction in relation to the rules with the actual real-time reporting of the instruction outcome and updating of the master database 24. This decoupling enables the positioning engine 154 minimise its processing tasks and therefore to have a greater throughput than would otherwise be the case.

The finality of the positioning engine 154 (the stamp saying that, whatever happens, the settlement instruction is confirmed) is not reached by reflecting the positioning engine updates in the master database 24 but by logging them in an update execution instruction in the finality queues 168. In other words, the finality instruction record (update execution instruction) is written to the finality queue 168, which is an input queue of the dispatcher 156. At that time, the original processing instruction is considered as final, namely executed. It is the responsibility of the dispatcher 156 to generate the notification to the parties to the instruction and to spread the updates on the different input queues (master data segregation queues 170) of the updater 158. The main objective is to avoid mixing, in the same logical unit of work, reporting activities with database balance updates.

Because the output generated by the positioning engine 154 is limited to one persistent message (containing all the master database updates to be implemented to complete the underlying instruction), a dedicated process to spread the updates and generate the requested reporting on the instruction execution (reply to a real-time individual instruction handling process 162 for example) is provided by the dispatcher 156. For one message received in input, the dispatcher 156 will write output (one per updated resource and one per generated report. To handle the global throughput requirement, this dispatching logic is run in parallel. The dispatcher 156 is scalable (throughput increases by running one more copy of the program).

The format of the reporting message generated by the dispatcher 156 is simply a structured text message. However, this format can be changed to use an external or ISO format if required. The dispatcher is also configured to generate processing session reports, which list all of the transactions which have occurred during that session and also the result they have had on the values of resource account files 30 and aggregated resource values 32 for each involved entity.

The dispatcher 156 does not determine which master data updater 190 needs to be instructed to carry out the update. Rather, this is left to the routing framework 175 and the workflow balancer 176 as is described below.

The routing framework 175 is provided to assist in the workflow balancing. The input to the initial input queues 164 and the output of the dispatcher program 188 towards the updater 158 onto the master segregation queues 170, are sent via the routing framework 175 and the workload balancer 178. The dispatcher program 188 sends the instruction onto the routing framework 175 without knowledge of the exact destination (master segregation queue 170) of that instruction. The purpose of the routing framework 175 is to prepare the instruction for specific routing to one of a plurality of possible queues operating concurrently on the platform. In this embodiment the routing framework prepares the instruction for routing to one of the plurality of initial input queues 164 or one of the master data segregation queues 170, as appropriate. The routing framework 175 adds two technical fields a message name and a workload balancing key. The message name describes the type of information contained in the message and the workload balancing key is set to an instruction ID to guarantee that two subsequent execution attempts will be reported in the same reporting sequence to avoid reporting an 'instruction settled' followed by an 'instruction failed' due to a sequencing issue for example. This is carried out by way of an internal look up table.

The routing framework 175 also has the ability to add a new process to the instruction flow to change the routing of an instruction between processes. It can also add a new instruction to an instruction flow, suppress the sending of an instruction from a process, and duplicate an instruction if required. The instruction with the message name and workload balancing key is then handled by the workflow balancer 176 as described below.

In the operation of the platform 150, it is the responsibility of the routing framework 175 to decide if a processing instruction is to be sent, to whom, in which format and on which instance (for parallel processing). The routing framework 175 is used to ensure that the reporting on one instruction is sequenced after the previous reporting for the same instruction. For example, where an instruction has failed several times before finally being accepted, reporting that that processing instruction has been successfully executed has to follow failed settlement reporting messages for the same instruction 156. Also the reporting of each failed instruction is sent in sequence to allow the instructing party to react to an instruction failure correctly.

Example. A first instruction processing attempt provides a failure, reason→the level of Party A's resource account is not sufficient to support the instruction (Party A can take some action). Then a second instruction processing attempt also fails, reason→the level of Party B's resource account is not sufficient to support the instruction (Party B can take some action). In reporting this it is important that a Party A's resource account fail message is followed by a Party B's resource account fail message. When running the dispatcher module in parallel, it is the responsibility of the routing framework 175 to send all the reporting for one instruction on the same instance of the dispatcher 156 (workload balancing on the instruction identifier).

The workload balancer 176 determines the final destination of the instruction based on the instruction name and balancing key (not shown) which together are considered by the processing platform 150 to describe uniquely each instruction. The message name is used to identify the target master data segregation queue 170 which in turn feeds a specific master data updater 190 (see later regarding how each master data updater 190 is directed to a specific type of updating). The balancing key is used to compute a specific instance (master data segregation queue 170). The workload balancer 176 guarantees that for the same key, it will always select the same instance (master data segregation queue 170)—see simple example below:

EXAMPLE

```
message name = 'SECURITY_BALANCE_UPDATE' =>
Security balance updater
balancing key = security id                        = 13
Total number of security updaters running in parallel   = 3
Selected instance           = 13 − (integer (13/3) * 3) + 1
                            = 13 − (4 * 3) + 1
                            = 13 − 12 + 1 = 2
=> each time an update is to be done for security id 13, the
instance number 2 will be selected (message routing).
```

Each of the master data segregation queues 170 simply receives instructions from the dispatcher program 188 which have been specifically routed to that queue 170 by the routing framework 175 and the workload balancer 176. Each master data segregation queue 170 relates to a specific master data updater 190 which in turn only operates on a specific portion 24a, 24b, 24c of the master database 24.

The updater 158 is dedicated to reflecting in one specific partition 24a, 24b, 24c of the master database 24, the update instruction declared as final by the positioning engine 156. Because each master data updater 190 is working independently on a unique database partition, it is not affected by any potential locks generated by other updating processes. Moreover, because each updater 190 solely updates the set of reference data it manages; it can perform netting of update instructions. Each instance of an updater works on its own range of keys (used to identify the updater to which the instruction is routed) whether those keys are isolated to a specific part of the master database or not.

There are two different embodiments of how the updater 158 is specifically implemented. In one embodiment the update instructions (updates) are documented delta, namely by the changes to the values of the resource account files. In another embodiment, the updates are documented by a last value of the resource account file. Both of these embodiments are described below as they effect the manner in which netting is performed.

When updates are documented by delta, the netting algorithm (not shown) implemented by the master data updater 190 comprises summing the movement of each instruction for a given resource account file 30 before executing one single update to that resource account file 30. When the updates are documented by last value, the netting comprises keeping the value having the higher update timestamp and adding the timestamp validation in the 'where' clause of the update statement (see example below).

More specifically, In the last value model, the netting process seeks to keep the last update carried out by the positioning engine 154. As the update sequence is not guaranteed, the netting algorithm can receive a last value at say 12:45:01 after already having received a last value at 12:45:03. To implement the update, only the last value at 12:45:03 has to be taken into account. Of course, if a last value say at 12:45:06 is already reflected in the database, the value at 12:45:03 has to be ignored. This can be done by using the timestamp when updating the master data as is illustrated below:
EXEC SQL UPDATE PP_SEC_BAL
   SET BALANCE_VALUE=Last value received in input,
     Balance timestamp=Last value positioning timestamp
   Where Balance ID=Balance id from the update request
     AND
     Balance Timestamp (in DB)<Last value positioning
       timestamp The update message received by the updaters are final (to be applied anyway). This means that they can be grouped together so that two subsequent update instructions for the same key are translated by the master data updater 190 into a single physical update.

Examples of how the last value embodiment and the delta value embodiment operate are set out below.

EXAMPLE FOR LAST VALUE

The updater receives the following input in sequence:
Balance1 10000 2007-08-01-09.01.01.112335 (time in micro seconds)
Balance1 12500 2007-08-01-09.01.02.100475
Balance1 25000 2007-08-01-09.01.01.875221
Balance1 12500 2007-08-01-09.01.02.077054

The master data updater 190 retrieves all the updates in sequence.

For the first one, it keeps the value (first time the balance is referred to in the current logical unit of work).

For the second one, it overrides the previous value in its memory (the request is future compared to the first one).

For the third, it discards it because the request was generated before the second value.

For the fourth, it discards it because the request was also generated before the second value.

At commit time (commit frequency), a physical update is generated:
EXEC SQL UPDATE SET Balance value=12500, Timestamp =2007-08-01-09.01.02.100475
Where balance id=balance1 and Timestamp <2007-08-01-09.01.02.100475

The timestamp condition will abort the update request if the image in the database is already future compared to the one which is proposed.

EXAMPLE FOR DELTA

The master data updater 190 receives the following input in sequence:
Balance1 10000 2007-08-01-09.01.01.112335 (time in micro second)
Balance1 12500 2007-08-01-09.01.02.100475
Balance1 25000 2007-08-01-09.01.01.875221
Balance1 12500 2007-08-01-09.01.02.077054

The master data updater 190 retrieves all the updates in sequence

For the first one, it keeps the value (first time the balance is referred to in the current logical unit of work).

For the second one, it adds the delta 10000+12500=22500
For the third, it adds the delta 22500+25000=47500
For the fourth, it adds the delta 47500+12500=60000

At commit time (commit frequency), a physical update is generated:
EXEC SQL UPDATE SET Balance value =Balance value+ 60000
Where balance id=balance1

Ensuring that the queues are usually empty by way of the pacing module 174 is not the only control that is implemented on the flow of instructions throughout the platform. During the real-time processing, the delimiter framework 178 ensures that all the updates carried out before the end of the processing session are correctly reflected in the master database 24 in order to start an end of processing session reporting activity in the dispatcher 156.

Writing an update execution instruction to the finality queue 168 can be considered as final execution of the instruction by the platform 150 even if the master database updates have not been carried out yet. However, it is still necessary to ensure from a technical point of view that the update execution instructions are actually implemented in the master database 24 before relying on the values of the master database resource accounts 30.

To achieve this objective constraint, the delimiter framework 178 provides a basic function which is to write a request/reply message to the top of the finality queue. When the reply is received, it means that all the instructions previously written to the finality queue have been executed.

The instruction processing flow in the platform 150 is composed on a set of processes executed in sequence. In particular, the master data segregation queues 170 handle update execution instructions only after they have passed through the finality queue 168. Accordingly, as soon as the reply is received from the finality queue, a new request/reply message is sent to the next queues in the sequence, namely the master data segregation queues 170. Each queue operates FIFO sequencing.

The function of the delimiter framework 178 is not checking that the master database has the correct updated data within it but rather that all the update execution instructions have executed in turn with this checking being carried out sequentially through the different processing stages of the system.

When the parallelism is implemented, a process could be run in parallel on multiple queues. In order to be sure that all the queues have processed their backlog, the request/reply message has not only to be written in one of them but in all. It is the responsibility of the routing framework 175 to detect that the message should be sent to the n instances of a process and it is the responsibility of the delimiter framework to wait until the n replies are received before starting delimiting the next process.

The following example sets out how the delimiter framework 178 operates to ensure execution of the update execution instructions by the updater 158 after the close of the processing session.

EXAMPLE

At a specific time, for example 4 PM, the platform 150 defines a deadline for executing instructions. As soon as a deadline is reached, a reporting process of extracting from the master database, all of the executed instructions in order to build a sequential reporting file to be sent to a party interested in the processing session activity.

AT 4 PM the scheduler starts the reporting process.

As a first step in the process, the delimiter utility (not shown but part of the delimiter framework 178) is used to generate and send a delimiter message to the delimiter kernel (not shown but also part of the delimiter framework 178). Based on the received message, the delimiter kernel starts writing messages to the different processes to be delimited to ensure that all the updates declared as final by the positioning engine 154 are reflected to the master database (Dispatcher 188 and Updaters 190).

As a second step of the reporting process, a delimiter completion check utility (not shown but part of the delimiter framework 178) is executed. It keeps the reporting process on hold until the delimiter process is declared as completed by the delimiter kernel. When this is done, the execution of the reporting process is resumed at the next step.

As a third step in the reporting process, reporting business logic in the dispatcher 188 is executed based on the accurate data contained in the master data.

The extraction report task requests the delimiter framework 178 to ensure that update execution instructions that arrived before the 4 PM deadline are processed by the dispatcher 156 for reporting purposes and that they are also applied to the master database 24. When this is done, the master database 24 status reflects all the activity confirmed before the deadline and the extract report can be generated accurately as has been described above.

The features described above, in relation to the embodiment of FIGS. 8 to 12, have been set forth in the appended claims. It is to be appreciated that further embodiments of the present invention can be created by utilising a subset of the features described above. For example a further embodiment may not use the recycling feature described above but may use a known alternative. Similarly the pacing module may be adapted or removed to provide a different solution. However, in the selection of an alternative data processing structure, the impact on throughput needs to be considered. In the present case it is considered that the claimed processing structure is an optimum structure which provides the best possible degree of throughput. Features such as the pacing module simply enhance the throughput.

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims.

The invention claimed is:

1. A system for processing and handling a plurality of processing instructions in real time during a processing session, each processing instruction specifying resource account data files relating to two different entities and the quantity and type of resources to be exchanged between those files, the system comprising:
a non-transitory, computer-readable medium storing executable instructions; and
one or more processors in communication with the non-transitory, computer-readable medium that, having executed the executable instructions, are programmed to:
instantiate a plurality of preloaders, each preloader being arranged to obtain reference data relating to the instructions, the reference data indicating the current values of each of the specified resource account data files, and the plurality of preloaders being arranged to operate in parallel to read the reference data from a master database for a plurality of respective received instructions;
establish an enriched instruction queue for queuing a plurality of the processing instructions together with their respective preloaded reference data;
instantiate an execution engine arranged to determine sequentially using the received reference data, whether each received instruction can be executed under the present values of the relevant resource account files and for each executable instruction to generate an updating command; and
instantiate a plurality of updaters, responsive to the updating command from the execution engine for updating the master database with the results of each executable instruction, the operation of the plurality of updaters being decoupled from the operation of the execution engine.

2. The system according to claim 1, wherein the one or more processors are further programmed to:
establish an initial input queue arranged to receive real-time instructions and batch instructions from a plurality of different sources and to queue the instructions for input to the preloaders.

3. The system according to claim 2, wherein the initial input queue comprises a plurality of initial input queues each one of the plurality being arranged to provide a dedicated input to a corresponding one of the plurality of preloaders.

4. The system according to claim 2, wherein the initial input queue is arranged to assign a priority to each incoming instruction.

5. The system according to claim 1, wherein the one or more processors are further programmed to:
implement a current condition table stored at the execution engine and arranged to be updated with the results of the executed instructions on the resource account files such that representation of an updated real-time value of each of the updated resource account files is obtained, wherein the execution engine is arranged, for the subsequent sequential processing of instructions, to use the information in the current condition table in preference to reference information from the preloader for a specific resource account data file.

6. The system according to claim 1, wherein the one or more processors are further programmed to:
implement a master data collector for each preloader, each master data collector being arranged to read from the master database the values of the resource account files identified in the instruction and aggregated resource values, and to compile and output an enriched processing instruction including the data read from the master database.

7. The system according to claim 1, wherein the execution engine comprises a high-speed local data memory for storing the current condition table.

8. The system according to claim 1, wherein the execution engine is arranged to determine whether the current instruction can be executed under the present values of the relevant resource account files by referring to a stored set of predetermined rules.

9. The system according to claim 1, wherein the one or more processors are further programmed to:
instantiate a time-stamping module arranged to determine the time of receipt of one of the processing instructions and to create a timestamp and apply the same to the processing instruction.

10. The system according to claim 1, wherein the one or more processors are further programmed to:
implement a recycling module for storing a list of failed processing instructions in a high-speed local data store and for carrying out a recycling procedure where the failed processing instructions are presented for re-execution after an update, in the resource accounts files identified by that failed processing instruction, has occurred.

11. The system according to claim 10, wherein the recycling module is arranged to store the failed instructions in order of their priority and to present the highest priority instructions first for re-execution during the recycling procedure.

12. The system according to claim 10, wherein the recycling module is arranged to reserve the current value of a resource account file for an instruction in the list and to use this reserved amount in fulfilling the requirements of the instruction during a recycling procedure.

13. The system according to claim 10, wherein the recycling module is arranged to present failed processing instructions for re-execution a predetermined maximum number of times, and if the processing instruction has still not been executed, the recycling module is arranged to cancel the failed instruction.

14. The system according to claim 1, wherein the one or more processors are further programmed to:
instantiate a reporting module for reporting the outcome of the execution of one of the received instructions, the reporting module being arranged to output the updating command for each instruction which it has been determined can be executed and a notification instruction for each failed instruction.

15. The system according to claim 14, wherein the reporting module is arranged to store temporarily a plurality of updating commands until a commit event occurs, and to output the plurality of stored updating commands on occurrence of the commit event, wherein the commit event represents the completion of one physical unit of work by the execution engine.

16. The system according to claim 14, wherein the one or more processors are further programmed to:
establish a finality queue arranged to receive and queue the updating command and the notification instruction from the reporting module.

17. The system according to claim 1, wherein each updater comprises a plurality of updating instances operating in parallel, each instance operating on a unique portion of the master database.

18. The system according to claim 17, wherein the one or more processors are further programmed to:
implement a segregation input queue for each updating instance, each segregation input queue being arranged to receive a plurality of updating commands pertaining to the specific portion of the master database which is updated by the corresponding updating instance.

19. The system according to claim 18, wherein each segregation input queue is arranged to effect netting of updating commands where the updating commands relate to the same reference account files.

20. The system according to claim 18, wherein the one or more processors are further programmed to:
instantiate a dispatcher module arranged to determine the routing of each updating command to a specific segregation input queue of the plurality of updating instances and to create reporting messages for the different entities in which the failure or success of an execution instruction is described.

21. The system according to claim 18, wherein:
the initial input queue comprises a plurality of initial input queues each one of the plurality of initial input queues being arranged to provide a dedicated input to a corresponding one of the plurality of preloaders; and
the one or more processors are further programmed to:
implement a routing framework, the routing framework being arranged to distribute an instruction to the plurality of initial input queues or segregation input queues operating concurrently.

22. The system according to claim 21, wherein the routing framework is arranged to assign to an instruction an instruction name describing the type of information the instruction relates to and a workload balancer key which provides the unique key identifying the instruction.

23. The system according to claim 22, wherein the one or more processors are further programmed to:
instantiate a workload balancer arranged in combination with the routing framework to select one of the initial input queues or segregation input queues by use of the received instruction name and workload balancer key.

24. The system according to claim 23, wherein the workload balancer is arranged to link a given workload balancer key to the same specific destination to ensure that all instructions relating to a specific resource account data file are always routed to the same one of the plurality of queues.

25. The system according to claim 1, wherein the one or more processors are further programmed to:
implement a delimiter framework arranged, in response to the closing of the processing session at a given time, to send a message to the input of a queue provided at the output of the execution engine and to await its response, and to send a further message to an input queue of one of the plurality of updaters and await its response, receipt of the sequential responses indicating updating of the master database with the results of all of the processing instructions executed before the close of the processing session.

26. The system according to claim 25, wherein the one or more processors are further programmed to:
instantiate a dispatcher module arranged to determine the routing of each updating command to a specific segregation input queue and to create reporting messages for the different entities in which the failure or success of an execution instruction is described; and wherein
the delimiter framework is also arranged to send a message to an input queue of the dispatcher module and to await respective feedback to confirm that reporting messages for the processing instructions executed before the close of the processing session, have all been sent.

27. The system according to claim 1, wherein the one or more processors are further programmed to:
instantiate a pacing module for determining the processing instruction throughput of the execution engine and applying wait states to any queue to slow down the speed of loading of processing instructions to less than the throughput of the execution engine.

28. A resource transfer system for processing and handling a plurality of resource transfer instructions in real time during a resource transfer processing session, the system comprising:
a non-transitory, computer-readable medium storing executable instructions; and one or more processors in communication with the non-transitory, computer-readable medium that, having executed the executable instructions, are programmed to:
instantiate a plurality of preloaders, each preloader being arranged to obtain reference data relating to the instructions, the reference data indicating the current values of each of the specified resource account data files, and the plurality of preloaders being arranged to operate in parallel to read the reference data from a master database for a plurality of respective received instructions; each processing instruction specifying resource account data files relating to two different entities and the quantity and type of resources to be exchanged between those account data files,
establish an enriched instruction queue for queuing a plurality of the processing instructions together with their respective preloaded reference data;
establish an execution engine arranged to determine sequentially using the received reference data, whether each received instruction can be executed under the present values of the relevant resource account data files and for each executable instruction to generate an updating command; and instantiate a plurality of updaters, responsive to the updating command from the execution engine for updating the master database with the results of each executable instruction, the operation of the plurality of updaters being decoupled from the operation of the execution engine.

29. The resource transfer system according to claim 28, wherein each resource transfer instruction comprises the following information:
- a) an identification of the resource to be exchanged;
- b) a quantity of resource to be exchanged;
- c) a cash currency to be used in the payment; and
- d) a cash amount.

30. The resource transfer system according to claim 28, wherein the one or more processors are further programmed to:
    establish a securities settlement system and the resource transfer instructions each comprise a security settlement processing instruction.

31. A computer implemented method of processing and handling plurality of processing instructions in real time during a processing session, each processing instruction specifying resource account data files relating to two different entities and the quantity and type of resources to be exchanged between those files, the method comprising:

obtaining, with one or more processors, reference data relating to instructions from a plurality of preloaders stored in a non-transitory computer-readable memory, each preloader being arranged to obtain reference data relating to the instructions, the reference data indicating the current values of each of the specified resource account data files, the obtaining step comprising operating the plurality of preloaders in parallel to read the reference data from a master database for a plurality of respective received instructions;

queuing, with the one or more processors, a plurality of the processing instruction together with their respective preloaded reference data in an enriched instruction queue;

using an execution engine being executed by the one or more processors to determine sequentially using the received reference data, whether each received instruction can be executed under the present values of the relevant resource account files and generating an updating command for each executable instruction; and updating, with the one or more processors, the master database with the results of each executable instruction using a plurality of updaters which are responsive to the updating command from the execution engine, the updating step being decoupled from the operation of the execution engine.

* * * * *